US006169547B1

(12) United States Patent
Tanaka et al.

(10) Patent No.: US 6,169,547 B1
(45) Date of Patent: *Jan. 2, 2001

(54) METHOD FOR DISPLAYING AN ICON OF MEDIA DATA

(75) Inventors: Tetsuo Tanaka, Sagamihara; Toshiaki Kohno, Machida; Hiroshi Tomita, Kawasaki, all of (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/974,226

(22) Filed: Nov. 19, 1997

Related U.S. Application Data

(63) Continuation of application No. 08/727,164, filed on Oct. 7, 1996, now Pat. No. 5,771,380, which is a continuation of application No. 08/631,438, filed on Apr. 12, 1996, now Pat. No. 5,586,316, which is a continuation of application No. 08/271,923, filed on Jul. 7, 1994, now abandoned.

(30) Foreign Application Priority Data

Feb. 23, 1993 (JP) ..................................... 5-033020
Jul. 9, 1993 (JP) ..................................... 5-170021

(51) Int. Cl.[7] ...................................... G06F 17/30
(52) U.S. Cl. .................... 345/348; 345/127; 345/342; 707/3; 707/4; 707/102; 707/526
(58) Field of Search .................. 707/3, 4, 102, 707/526; 345/348, 342, 127

(56) References Cited

U.S. PATENT DOCUMENTS

Re. 33,316   8/1990   Katsuta et al. .................. 395/128
4,604,653    8/1986   Shimizu ........................... 358/256
4,808,987    2/1989   Takeda et al. .................... 345/115
4,821,121    4/1989   Beaulier .......................... 358/160
4,829,453    5/1989   Katsuta et al. ................... 382/305
4,970,545   11/1990   Inagawa ........................... 355/45
4,992,887    2/1991   Aragaki .......................... 358/403
5,027,421    6/1991   Kanno ............................. 382/305
5,053,956   10/1991   Donald et al. .................... 364/401
5,129,011    7/1992   Nishikawa et al. ................ 382/173

(List continued on next page.)

FOREIGN PATENT DOCUMENTS 1 276 347   11/1989   (JP) .
2 535466     5/1993   (JP) .

Primary Examiner—Jean R. Homere
(74) Attorney, Agent, or Firm—Kenyon & Kenyon

(57) ABSTRACT

An information processing system for creating a search data for an application-specific data is proposed. An application processing section inputs or edits data on the basis of an application program. An application-specific data storage section stores the application-specific data input or edited by the application processing section. A search data is created by a search data creating section for searching the application-specific data stored in the application-specific data storage section for a specific data. The search data creating section also creates a correspondence between the search data and the application-specific data. A search data storage section stores the search data created by the search data creating section. A correspondence storage section stores the correspondence between the search data and the application-specific data. Further, a data output section connected to and shared by a plurality of data input or editing units including the application processing section and the search data creating section. The search data creating section creates the search data from the application-specific data sent from the application processing section to the data output section.

3 Claims, 23 Drawing Sheets

U.S. PATENT DOCUMENTS

| | | | |
|---|---|---|---|
| 5,206,931 | 4/1993 | Kimura et al. | 395/161 |
| 5,231,578 | 7/1993 | Levin et al. | 364/419 |
| 5,241,671 | 8/1993 | Reed et al. | 395/615 |
| 5,299,116 | 3/1994 | Owens et al. | 364/403 |
| 5,350,303 | 9/1994 | Fox et al. | 434/118 |
| 5,367,626 * | 11/1994 | Morioka et al. | 395/348 |
| 5,383,029 | 1/1995 | Kojima | 358/403 |
| 5,479,602 * | 12/1995 | Baecker et al. | 345/349 |
| 5,557,728 * | 9/1996 | Garrett et al. | 345/340 |
| 5,576,946 * | 11/1996 | Bender et al. | 364/146 |
| 5,586,316 * | 12/1996 | Tanaka et al. | 707/4 |
| 5,625,810 * | 4/1997 | Kurosu et al. | 707/1 |
| 5,657,433 | 8/1997 | Murase et al. | 395/133 |
| 5,680,558 * | 10/1997 | Hatanaka et al. | 345/334 |
| 5,742,808 * | 4/1998 | Hasuo | 707/1 |

* cited by examiner

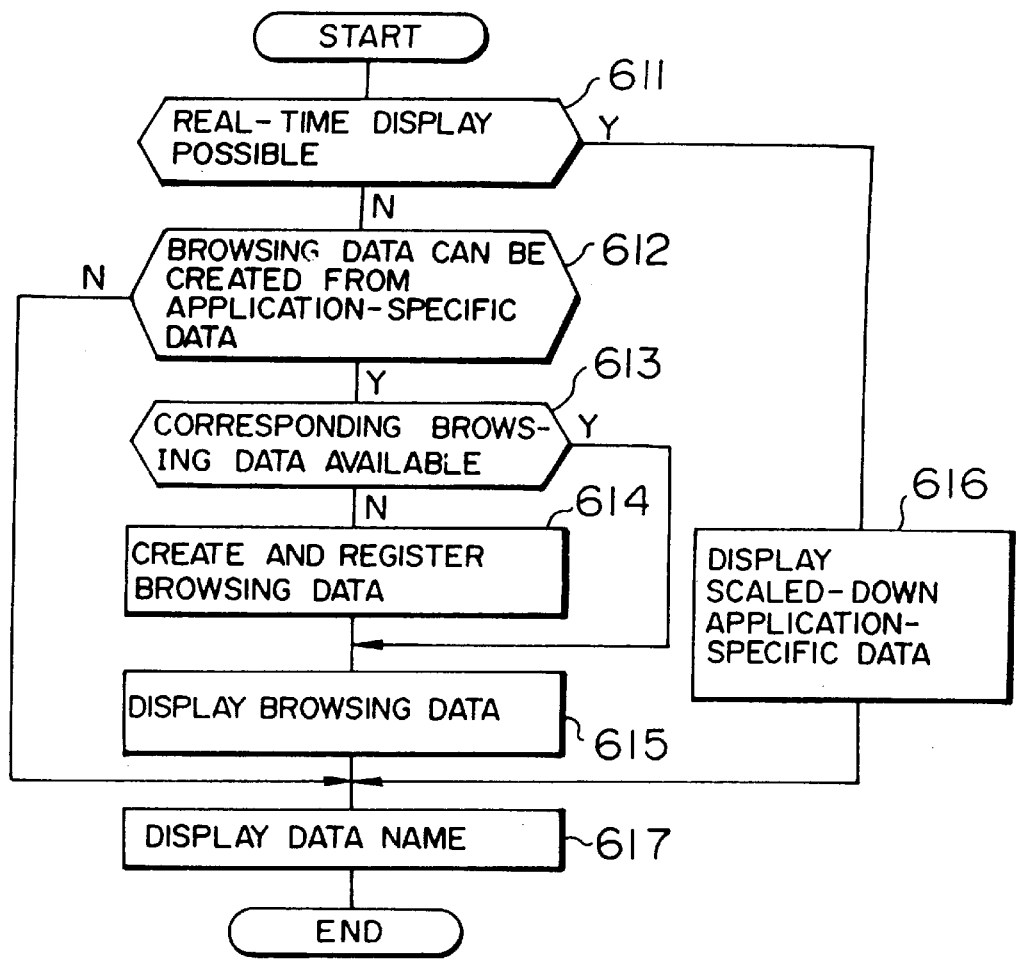

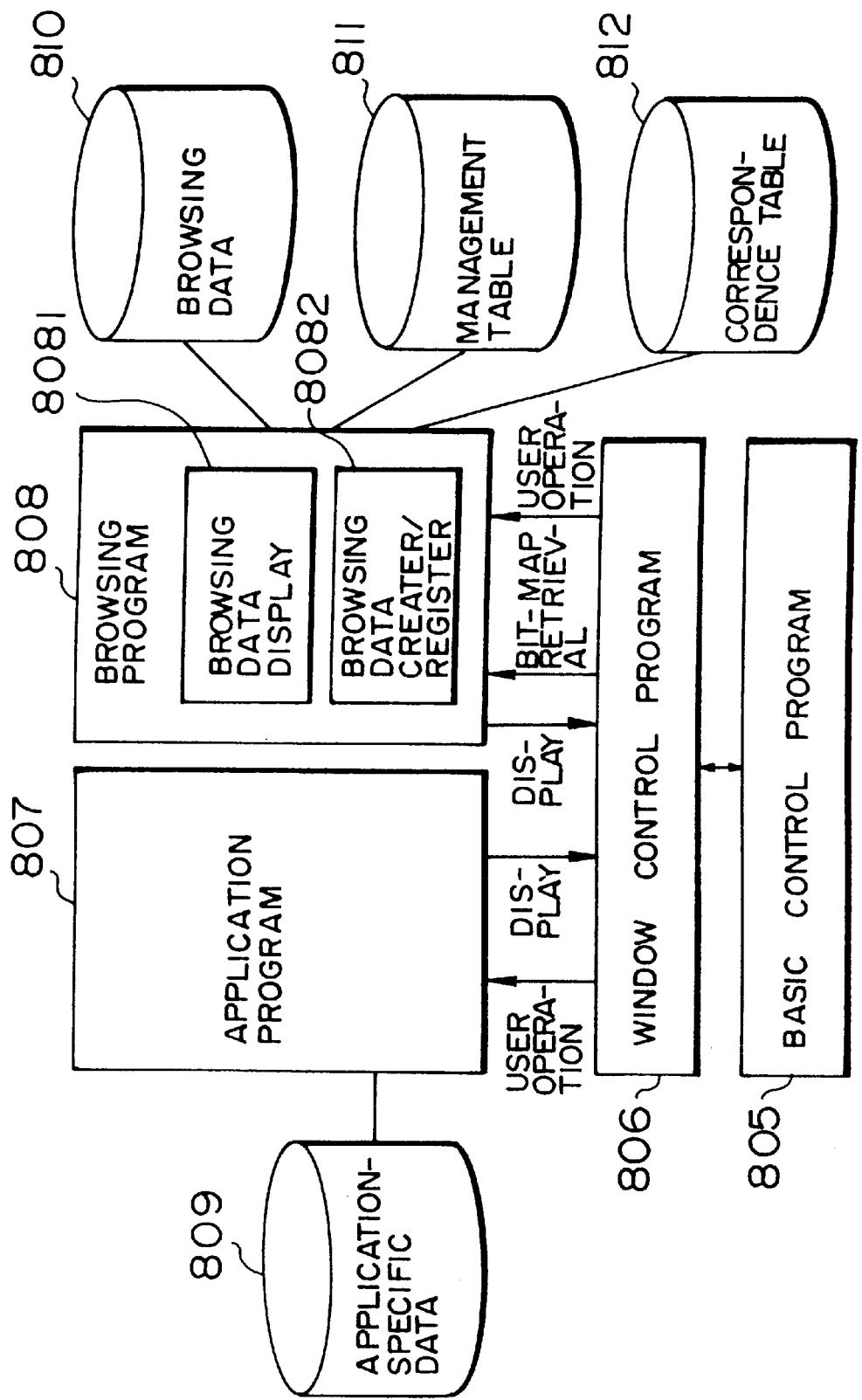

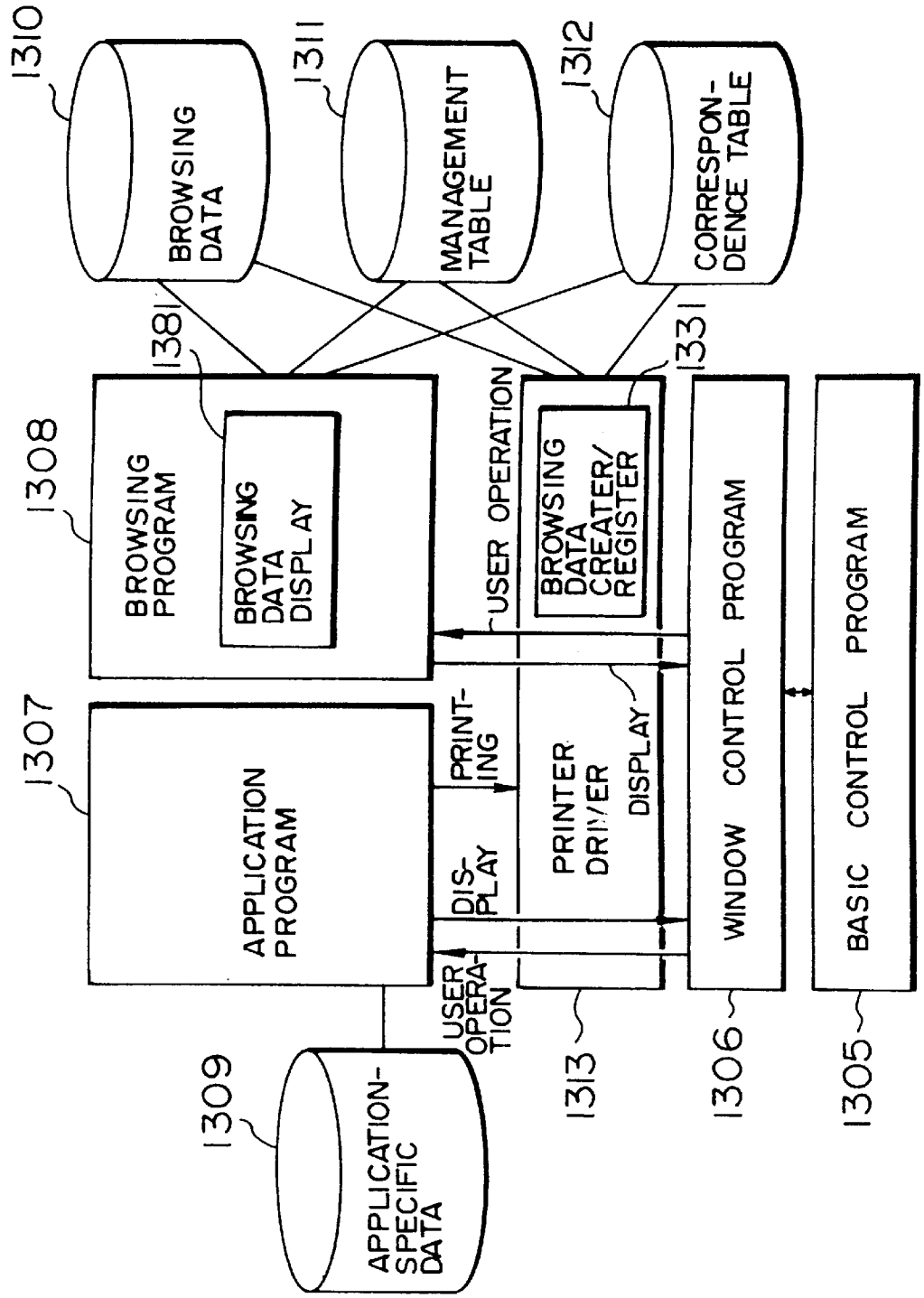

FIG. 22

| # | REQUEST | PARAMETER | RETURN VALUE |
|---|---|---|---|
| 401 | CREAT BROWSING DATA ANEW | MEDIA DATA IDENTIFIER, NUMBER OF PAGES, SCALE-DOWN ALGORITHM | NIL NIL |
| 402 | DELETE BROWSING DATA | MEDIA DATA IDENTIFIER | NIL |
| 403 | DELETE PAGE | MEDIA DATA IDENTIFIER, PAGE | NIL |
| 404 | ADD PAGE | MEDIA DATA IDENTIFIER | NIL |
| 405 | REGISTER FEATURE PAGE | MEDIA DATA IDENTIFIER, PAGE | NIL |
| 406 | RETRIEVE FEATURE PAGE | MEDIA DATA IDENTIFIER | FEATURE PAGE |
| 407 | RETRIEVE NUMBER OF PAGES | MEDIA DATA IDENTIFIER | NUMBER OF PAGES |
| 408 | RETRIEVE FEATURE PORTION | MEDIA DATA IDENTIFIER, PAGE | FEATURE PORTION |
| 409 | REGISTER PAGE DATA | MEDIA DATA IDENTIFIER, PAGE, SCALE-DOWN RATIO, BIT-MAP-ID, FEATURE PORTION | NIL |
| 410 | RETRIEVE PAGE DATA | MEDIA DATA IDENTIFIER, PAGE, SCALE-DOWN RATIO, FEATURE PORTION | BIT-MAP-ID |
| 411 | ACTIVATE PAGE DATA | MEDIA DATA IDENTIFIER, PAGE, SCALE-DOWN RATIO, FEATURE PORTION | NIL |
| 412 | END | NIL | NIL |

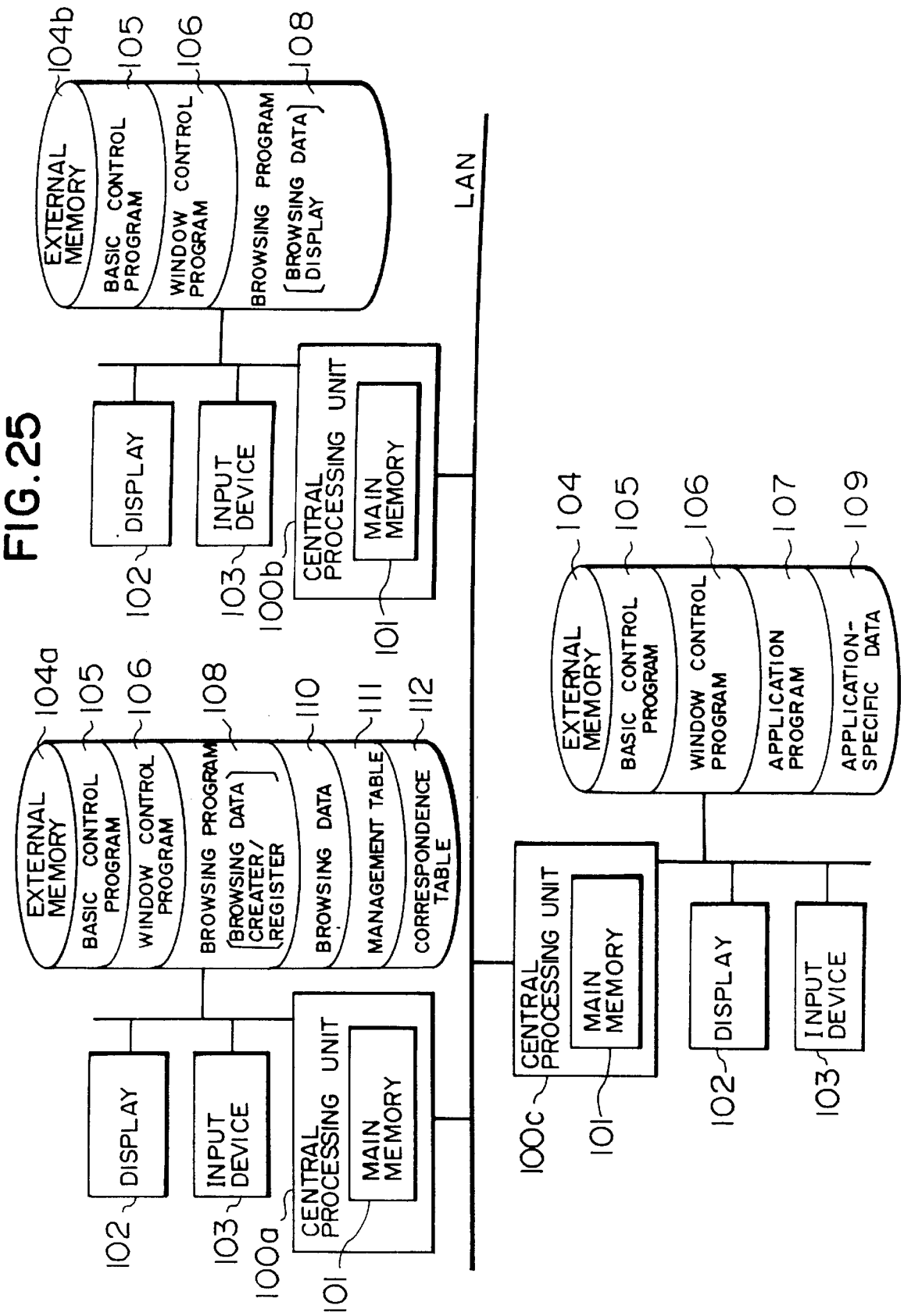

METHOD FOR DISPLAYING AN ICON OF MEDIA DATA

This is a continuation of application Ser. No. 08/727,164 filed Oct. 7, 1996, now U.S. Pat. No. 5,771,380, which is a continuation of application Ser. No. 08/631,438 filed on Apr. 12, 1996, now U.S. Pat. No. 5,586,316 which is a continuation of application Ser. No. 08/271,923 filed Jul. 7, 1994, abandoned.

BACKGROUND OF THE INVENTION

The present invention relates to an information processing system such as workstations or personal computers which prepare, search and store a wide variety of media data including texts, graphics, images and video, or more in particular to the processing of browsing data for handling a scaled-down image of documents, etc.

In the conventional information processing systems such as the workstations and personal computers in which the documents or spreadsheets are prepared, data such as graphs and image data applied from an image scanner are stored in a memory such as a disk in the form of a file. The operator causes a list of file names and icons to be displayed on the display screen and designates the file name or the icon of the desired information thereby to access a particular field.

In JP-A-1-276347 entitled "Information Processing System", a predetermined page to of a file is extracted and the page data thus extracted is scaled down. The page data for a plurality of files thus scaled down are displayed on the display unit simultaneously. The user can easily search for the desired data by viewing the scaled-down data of the pages.

Also, the thesis entitled "How to Handle Large-Scale Document Data in Hypermedia Authoring Tool" by Kii, et al., pp. 3–345 to 3–348, a Collection of Lectures at the 44th National Convention of the Information Processing Society of Japan discloses a method in which the scaled-down image of each document page is displayed on the screen or the contents of each page are displayed successively in the same region.

Displaying the scaled-down images of each page of a document on the screen or the contents of each page successively in the same region will hereinafter be referred to as the "browsing".

In the method for displaying a list of file names or icons on the screen and causing the user to select any one of them, however, file names, names of persons that have prepared them, the date of preparation and symbols representing the program used for preparation are displayed at most. To access to data contents, therefore, it is necessary to invoke the application program by which the data has been prepared or which displays the data contents.

Further, JP-A-1-276347 and the "Hypermedia Authoring Tool" fail to refer to the browsing of the data prepared by the existing application programs. More specifically, the data input or edited by the program offered by the system can be browsed, while the data prepared by other programs cannot. In the latter case, for the program offered by other than the system, the browsing is made possible by generating and managing the browsing data corresponding to the data prepared by the program. To realize this, however, it is necessary to reconstruct the program in such a manner as to generate browsing data or to prepare a data conversion program for generating a browsing data from a program-specific data for each of the programs. Also, preparation of a data conversion program makes it necessary to know the program-specific data format.

Further, the above-mentioned prior art fails to refer to the image quality after scale-down. More specifically, because of a scaled-down image, the lines are reduced in size or thin out, or the text information or graphics information are substantially lost. As a result, although the person who has prepared the data can associate the page contents, the user who simply references cannot substantially obtain the information on the pages. Also, the data quantity is increased due to the image information that is handled, and it takes a considerable time before data is read out of the file and displayed.

SUMMARY OF THE INVENTION

The present invention has been developed in view of the above-mentioned prior art, and the primary object thereof is to provide an information processing system, in which the contents of the media data including documents, graphs, spreadsheets and animations prepared by an application program, image data input from an image scanner or the like, video data input from the camera, and composite data prepared by combining such data can be easily referenced without the user invoking an application program for displaying the data contents. Another object of the invention is to provide an information processing system, in which the data used for referencing (browsing data) are prepared independently of the application program, i.e., without changing the application program or knowing the data format specific to the application program. Still another object of the invention is to provide an information processing system, in which the quality of the scaled-down image used for accessing is improved.

To achieve the above-mentioned objects, according to one aspect of the present invention, there is provided an information processing system comprising a plurality of application programs, output means such as a display and a printer shared by the application programs, means for generating browsing data from the data output by the application programs to the display or the printer, means for relating the application-specific data to the browsing data, and means for displaying the browsing data on the display.

According to another aspect of the invention, there is provided an information processing system comprising means for scaling down the media data without being converted to an image data, means for generating the image data (hereinafter referred to as "the browsing data") configured in such a manner as to permit the grasping of the contents of the media data, means for relating the browsing data thus generated to the media data, means for searching for the browsing data from media data identifiers, means for scaling up/down the browsing data thus searched for, and means for displaying the browsing data thus scaled up/down. There are a plurality of means for scaling up/down the browsing data, which are changeable according to the characteristics of the browsing data.

At the time of data search, a list of browsing data is displayed on the display and the application-specific data corresponding to the browsing data selected by the user are searched for by using the relating means.

At the time of data registration, on the other hand, the browsing data are prepared from the data applied to the display or printer at the same time that the application-specific data are registered, and are managed in relation to the application-specific data.

In the case where the application for preparing media data is different from that for searching for media data, display of the browsing data by the search application suffices for accessing the contents, and it is not necessary to invoke the application for media data preparation simply for accessing the contents.

In the case where the user is caused to select a file storing the media data at the time of executing an application, a list of browsing data is displayed on the screen for selection by the user instead of causing the user to input a file name or select from a list of file names or icons displayed. As a result, the user can select a file after knowing the file contents, thereby facilitating the acquisition of an intended media data. Also, in the case where the media data is so large as to cover a plurality of pages, the pages are successively displayed (hereinafter referred to as "page flipping") or all the pages are displayed simultaneously in the form of a list on the screen, with the result that the user is able to understand the whole contents of the media data and therefore decide whether a particular file is the one intended for.

Further, in view of the fact that the browsing data are generated from the data output on the printer or the bit-map data displayed on the display screen, the browsing data corresponding to the application-specific data can be generated without modifying the application program at all. As a consequence, the data generated by the application program that has been developed independently of the browsing program can be browsed even when the particular data format is unknown.

Also, in addition to the method for scaling down the browsing data by generating the browsing data, a scaled-down image can be generated by the method described below, in which the media data is scaled down with the same format and the browsing data is prepared from the media data thus scaled down. In the method for producing a scaled-down image by scaling down the browsing data, it may be difficult to grasp the data contents due to the disappearance of line in the case where the original browsing data are texts or graphics. The method for generating browsing data from media data, on the other hand, can produce a high-quality scaled-down image as the information amount is not reduced at the time of scale-down.

Furthermore, different suitable scale-down means are used for the binary images (black-and-white images) including texts and graphics and the full-color images including natural images. According to the present invention, a plurality of scale-down means are provided from which an appropriate means can be selected, thereby achieving a high-quality scaled-down image.

BRIEF DESCRIPTION OF THE DRAWINGS

FIG. 6 is a flowchart showing the details of a list of scale-down bit-map data of the data obtained by search.

FIG. 7 is a correspondence table between the data format and data structure.

FIGS. 8A and 8B are diagrams showing an example of hardware and software configuration according to a modification of the embodiment shown in FIG. 1.

FIGS. 13A and 13B are diagrams showing the hardware and software configurations of a modification of the embodiment shown in FIG. 11.

FIG. 22 is a list of requests accepted by the browsing data management section and the parameters and return values thereof.

FIG. 25 is a diagram showing an example configuration of a modification according to the embodiment shown in FIG. 15.

DETAILED DESCRIPTION

Embodiments of the invention will be described below with reference to the accompanying drawings.

Figure 1:
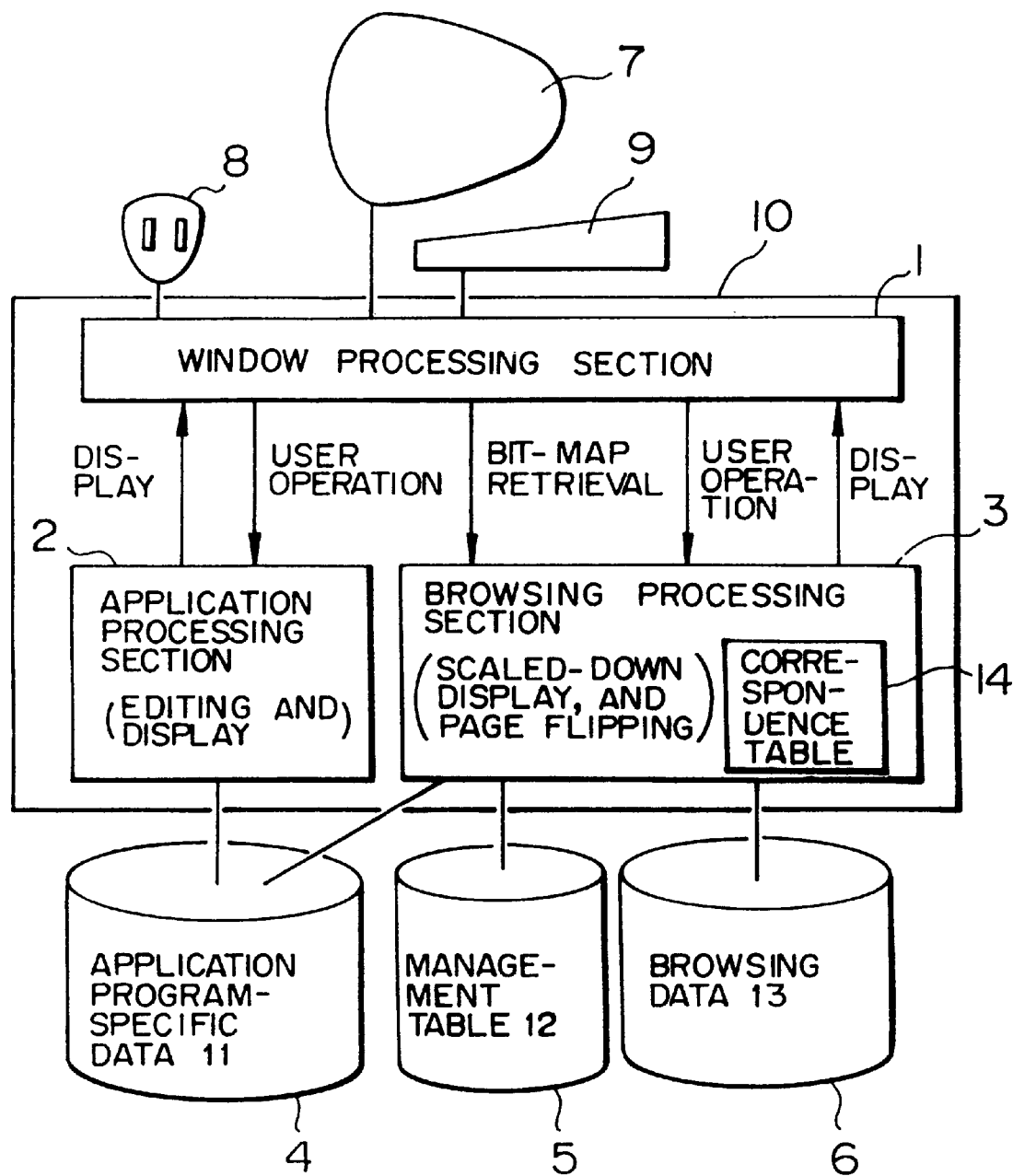
FIG. 1 is a diagram showing the block configuration of an embodiment of the present invention.

FIG. 1 shows an example of block diagrams for an information processing system according to the present invention. The information processing system according to the invention, as shown in FIG. 1, comprises a mouse 8 and a keyboard 9 for receiving an input from the user, a display 7 for performing the display, a system device 10 for performing the processings, and disks 4, 5, 6 for storing data. The system device 10 includes an application processing section 2 for editing/displaying texts, graphics, images, video and other media data, a browsing processing section 3 for managing the relation between application-specific data and browsing data, list display and scaled-down display of browsing data and registering the browsing data, and a window processing section 1 for receiving the input from the mouse 8 or the keyboard 9 and sending them to the section 2 or 3 and displaying the output from the section 2 or 3 on the display 7.

The application processing section 2, the browsing processing section 3 and the window processing section 1 are configured for storing and causing dedicated processors to execute each job of an application program, a browsing program and a window system program. The browsing processing section 3 includes a correspondence table 14 for designating data types and the video scale-down algorithm for creating the browsing data. The disk 4 stores the application-specific data 11 such as sentences generated on the word processor, for example, according to the application program 2. The disks 5, 6, on the other hand, store the management table 12 created by the browsing processing section 3 and the browsing data 13. The management data in the management table 12 are information for managing the relation between the application-specific data 11 and the browsing data 13.

Figure 2A:
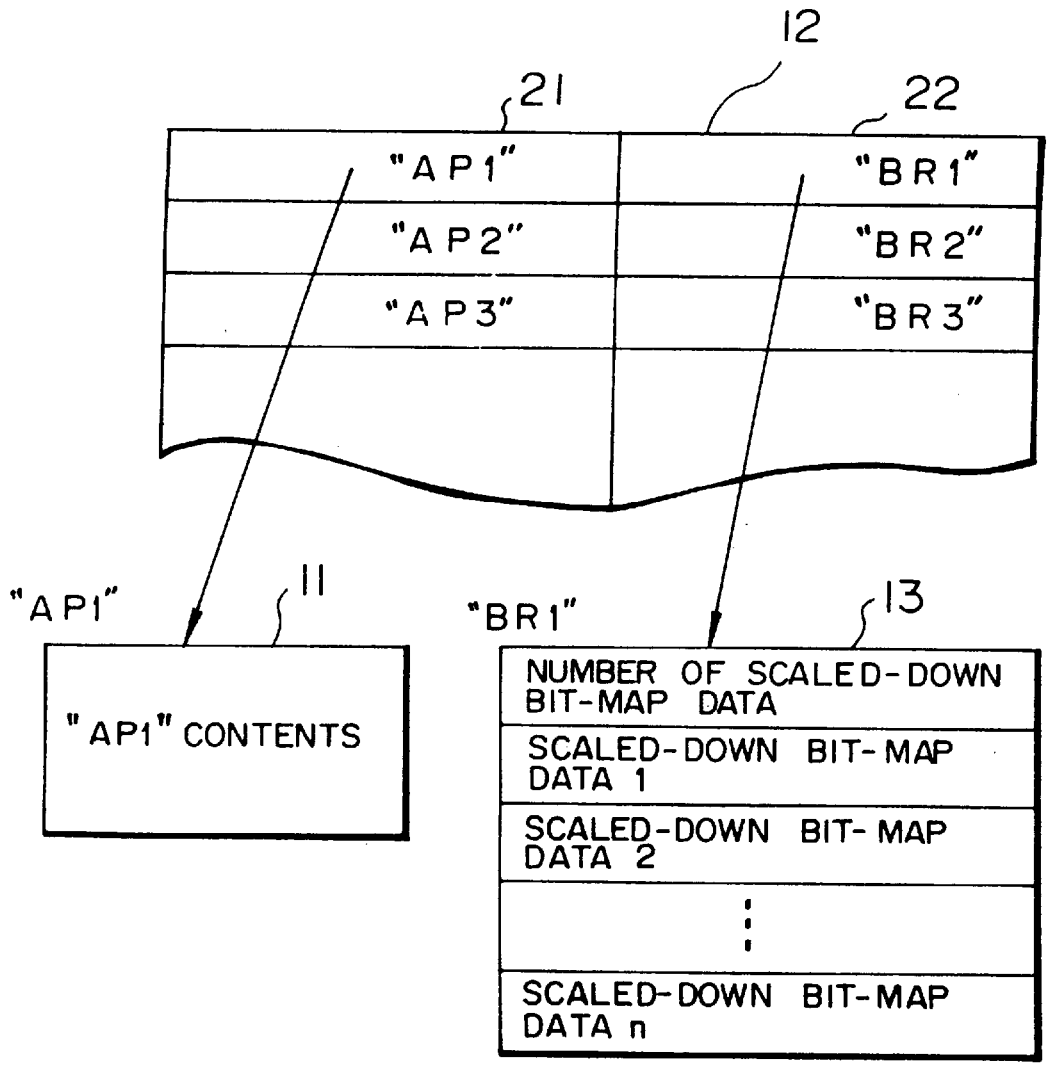
FIGS. 2A and 2B are diagrams showing the configuration of a management table and a correspondence table.
Figure 2B:
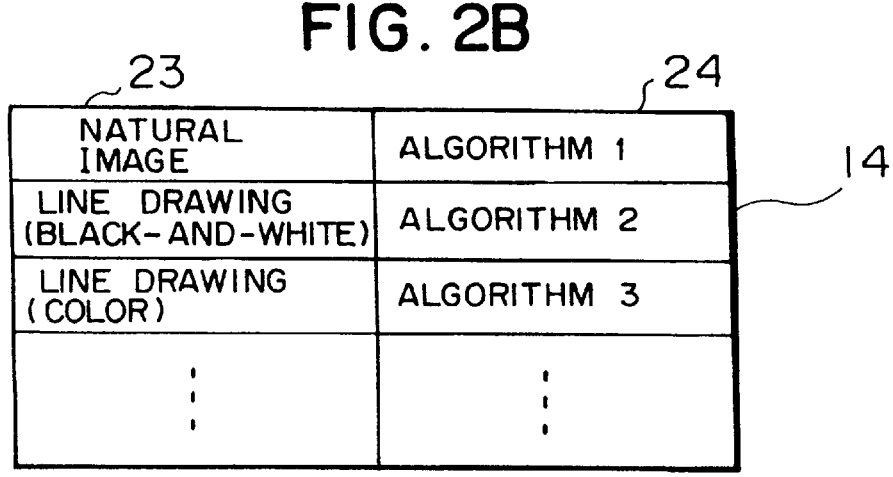

FIG. 2A is a data format for the application-specific data 11, the management table 12 and the browsing data 13, and FIG. 2B a data format for the correspondence table 14. The management table 12 includes data names 21 of the application-specific data 11 and identifiers 22 for the browsing data 13. The browsing data 13, on the other hand, include a plurality of scaled-down bit-map data 1 to n and the numbers thereof. The scaled-down bit-map data 1 to N are created either by scaling down the bit-map data received from the window system 1 or by reading and converting the application-specific data. The correspondence table 14 includes data types 23 and algorithm identifiers 24. According to this embodiment, the scaled-down version of the bit-map data retrieved from the window system 1 is used as the browsing data 13. The appropriate scale-down algorithm, however, varies with the type of original bit-map data. The correspondence table 14 is for attaining correspondence between the data type and the appropriate scale-down algorithm.

Figure 3:
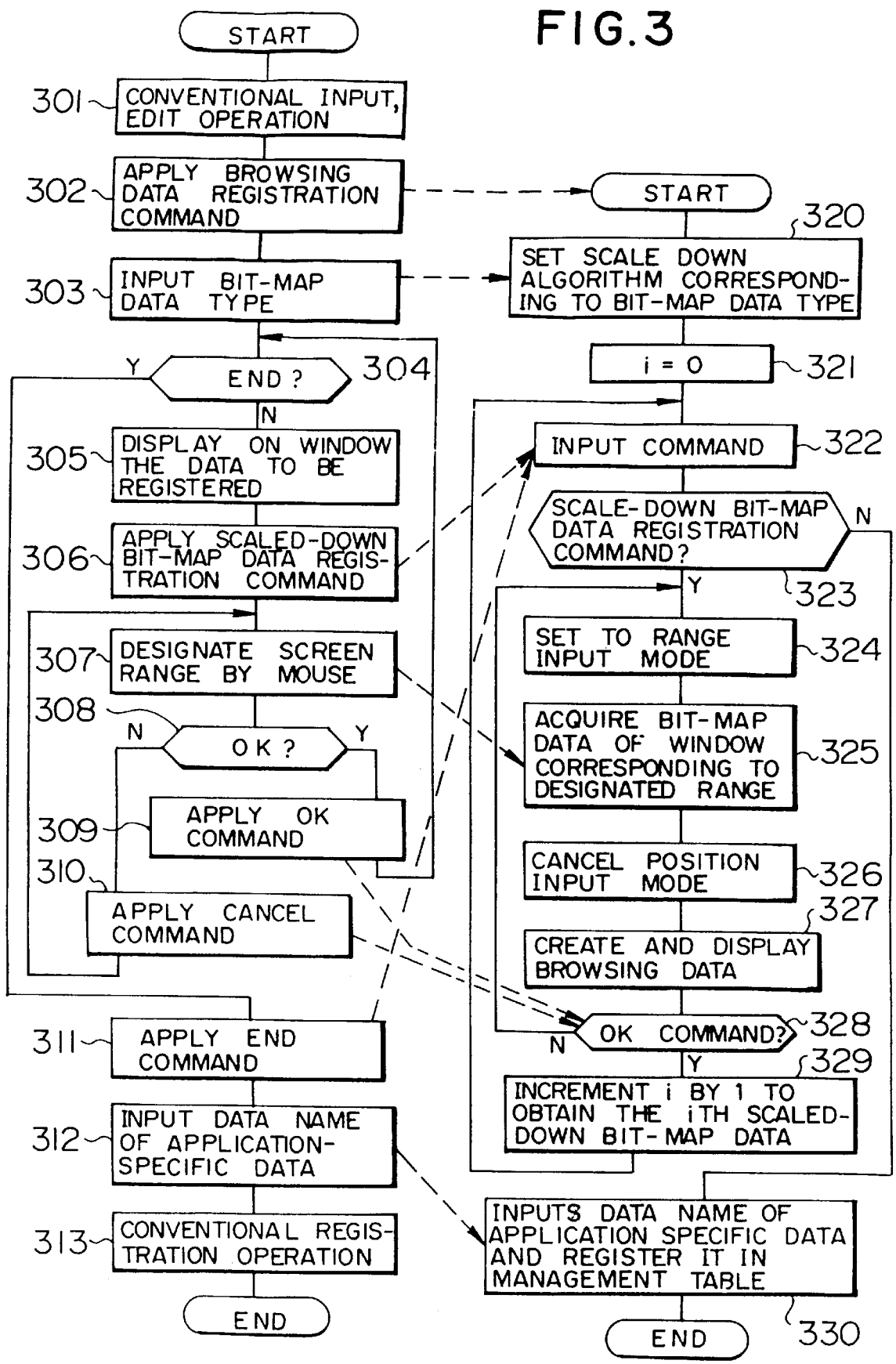
FIG. 3 is a flowchart for explaining the processing of browsing data.

The browsing program 3 registers the browsing data 13 and displays the browsing data 13 or the application-specific data 11 according to the user operation. FIG. 3 shows the flow of user operation and registration of the browsing data of the browsing program 3, FIG. 4 an example of screen for data display, FIG. 5 the flow of operation for data display, and FIG. 6 the detail of step 513 in FIG. 5.

Next, the flow of processings for browsing data registration for the browsing program 3 will be explained with reference to FIGS. 1 to 3. In FIG. 3, numerals 301 to 303 designate a user operation flow, and numerals 320 to 330 a flow of operation for a browsing program.

The user first performs the conventional input and editing operation using the application program 2 (step 301), and at the end of editing, applies a browsing data registration command from the mouse 8 or the keyboard 9 (step 302) thereby to input the data type such as natural Image, or line drawing, black-and-white or color (step 303). The browsing program 3 sets the scale-down algorithm corresponding to the input data type (step 320) thereby to set i to 0 (step 321) using the correspondence table 14.

The user, upon completion of registration of the browsing data (step 304), applies a termination command (step 311). In the case where the browsing data registration is not yet complete (step 304), the following processes are executed. First, the data-to be registered (natural image or line drawing) is displayed on the window (step 305), a scaled-down bit-map data registration command is applied (step 306), a display range is designated by the mouse (step 307), and if the designated range meets the requirement by reference to the browsing data displayed by the browsing program (step 308), an OK command is applied (step 309). Otherwise (step 308), a CANCEL command is applied (step 310) and the process returns to step 307. Meanwhile, the browsing program applies a command (step 322), and repeats the following process while the particular command remains a scaled-down bit-map data registration command (step 323). First, the range input mode is entered (step 324), the window bit-map data corresponding to the designated range is retrieved from the window system 1 (step 325), the position input mode is cancelled (step 326), the bit-map data thus retrieved is scaled down by the algorithm set at step 320 with the result thereof displayed on the display (step 327), the command is received, and if the particular command is an OK command (step 328), i is incremented by one as the ith scaled-down bit-map data of the browsing data 13 (step 329). Otherwise (step 328), the process returns to step 324. The user, after applying the termination command, inputs the data name 21 of the application-specific data (step 312) and thus performs the conventional operation for registration specific to the application program (step 313). The browsing program, after applying a termination command, inputs the data name 21 of the application-specific data, and together with the identifier 22 of the browsing data created by the above-mentioned operation, registers it with the management table 12 (step 330). In the process, the range input mode (step 324) is defined as the state in which all the inputs from the mouse or keyboard are acceptable, that is, the inputs are not delivered to the application processing section 2.

The flow of operation for data search at the browsing processing section 3 will be explained with reference to FIGS. 1, 2 and 4 to 6.

Figure 4:
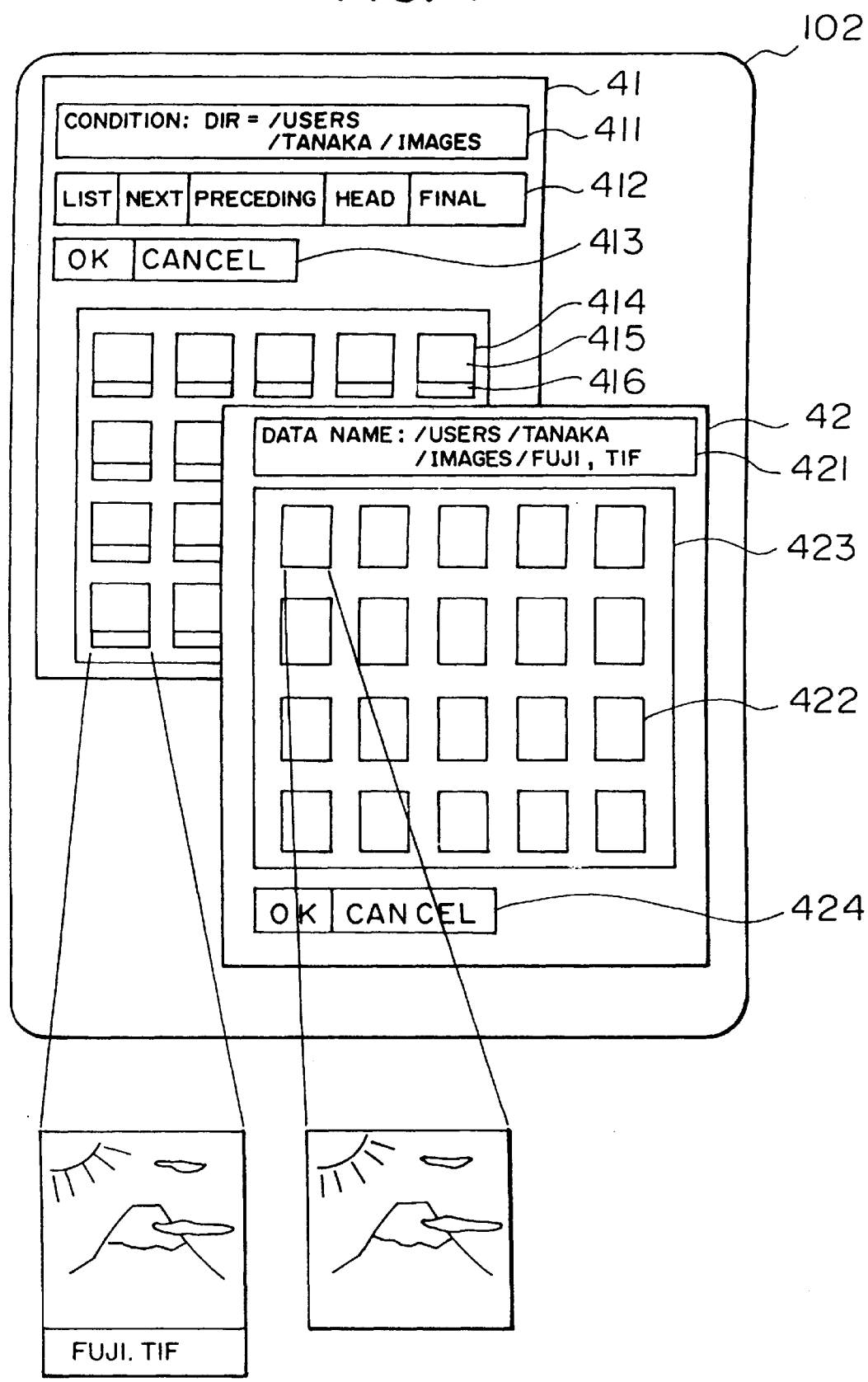
FIG. 4 is a diagram showing an example display of the display unit.

FIG. 4 shows an example of screen for data search. The search screen 41 includes a condition input section 411, a command input section 412 and an icon list display section 413 which is a region for displaying a plurality of icons 414. The icon 414 includes a scaled-down image display section 415 and a data name display section 416. The condition input section 411 is a region for inputting search conditions such as "the directory name having a file", "the file including 'xx' in the file name" or "the file prepared on or after a given date". The command input section 412 includes a "list button" for displaying a list of all the scaled-down bit-map data for the browsing data, a "next button", a "preceding button", a "leading button", and a "final button" for changing the scaled-down bit-map data displayed, and an "OK button" and a "CANCEL button" for applying an OK command and a CANCEL command respectively. When an icon 414 is selected by mouse, the related command is applied thereafter to the particular data.

The browsing processing section 3 is for displaying the scaled-down bit-map data list screen 42 on the display once the list button is selected by the mouse. The screen 42 includes a data name display section 421, a scaled-down bit-map data list display section 422, and a command input section 424. The scaled-down bit-map data list display section 422 includes a plurality of scaled-down bit-map data display sections 423.

When "list" command 412 is selected after one of the icons 414 is selected, the data list display section 422 is obtained as a list.

Figure 5:
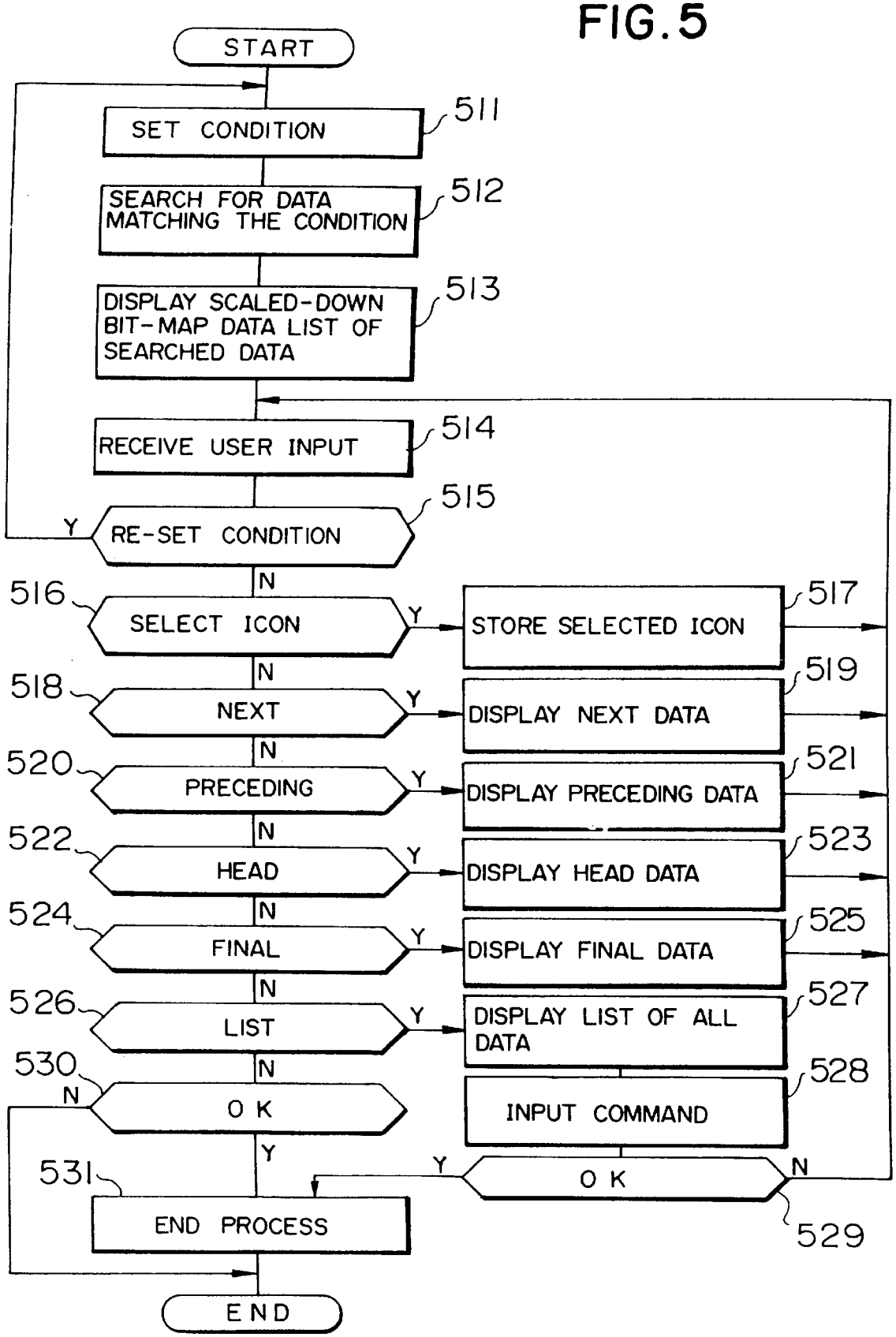
FIG. 5 is a flowchart showing the browsing data search.

As shown in FIG. 5, when a search condition is input to the condition input section 411 (step 511), the browsing program stored and executed in the browsing processing section 3 searches for the data name 21 of the application-specific data 11 matching with the particular search condition (step 512), displays the scaled-down bit-map data and the data name 21 corresponding to all the search result data and the data names 21 on the icon 414 (step 513), accepts the input from the user (step 514), and if the input is for resetting the condition (step 515), returns to step 511. In the case where the input is not for resetting the condition but for selecting an icon (step 516), on the other hand, the selected icon is stored (step 517), with the process returning to step 514. Otherwise, if the input is for selection of the next button (step 518), the next scaled-down bit-map data is displayed on the selected icon (step 519), with the process returning to step 514. When the selection of the preceding button is involved (step 520), the preceding scaled-down bit-map data is displayed on the selected icon (step 521), with the process returning to step 514. If the input is for selecting the head button (step 522), the head scaled-down bit-map data is displayed on the selected icon (step 523), with the process returning to step 514. Otherwise, if the selection of the final button is involved (step 524), the final scaled-down bit-map data is displayed on the selected icon (step 525), with the process returning to step 514. If the selection is the list button (step 516), a list of all the scaled-down bit-map data of the browsing data corresponding to the icon selected is displayed on the display 42 (step 527). If selection of the OK button is involved (step 530), the terminating process is performed (step 530); otherwise, when the CANCEL button is selected (step 530), nothing is done to terminate the process. Also, after the step 527, a command is input on the scaled-down bit-map data list display screen 42 (step 528). If the selection is the OK button (step 529), the process returns to step 531; otherwise, the process returns to 514 if the CANCEL button is involved (step 529). The terminating process (step 531) is defined as a process for delivering the name of the application-specific data corresponding to the icon selected at the time of selection of the OK button to the application processing section 2 utilizing the same data name.

A detailed processing flow of step 513 will be explained with reference to FIG. 6. The application-specific data are of three classes according to their characteristics. The first is those by which the browsing program stored in the browsing processing section 2 can interpret the data format thereof and the data allows automatic and rapid read operation and creation of a scaled-down image (such as ASCII character strings, JIS character strings, graphic data of a specified format, etc.); the second is those by which a scaled-down image can be automatically created, although the creation or reading thereof consumes a considerable time (such as image data of a specified type); and the third class is those of a data format that cannot be interpreted by the browsing program. According to this embodiment, display is differentiated according to these classes.

Step 513 performs the following operations on all the data providing the result of search made at step 512.

First, whether the data providing the search result can be scaled down and displayed by being processed real-time (step 611) is decided. If it is possible, a scaled-down image is created (step 616) and displayed on a scaled-down bit-map data display section 415 (step 617) real time. In the case where the scaled-down display of data is impossible, on the other hand, whether automatic creation of the browsing data from the application-specific data is possible or not is decided (step 612). If this is impossible, nothing is displayed on the scaled-down bit-map data display section. If the automatic creation is possible, on the other hand, the presence or absence of the corresponding browsing data identifier 22 is decided using the management table 12 (step 613). When such an identifier 22 is not available, the browsing data is automatically created (step 614). Next, the first scaled-down bit-map data for the browsing data is displayed on the scaled-down bit-map data display section (step 615), finally followed by displaying the data name (step 617).

The decision at steps 611 and 612 is made in such a way that first the data format is decided, followed by the decision on one of the above-mentioned three classes to which the data format decided corresponds. Decision on the data format is made according to the data name of the application-specific data. This decision is made in such a manner as follows: "When a data name ends in '.TXT', a text data is involved" or "When the end of a data name is '.TIF', the particular data has a data format TIFF". This is, however, conditional on the fact that the application program is given the data name according to the above-mentioned rule. As an alternative, the application-specific data may be read to make decision according to the features of the data. For example, decision is made that ASCII text is involved if all the bytes or the leading several bytes range from 0 to 127 inclusive. Which one of the above-mentioned classes to which the data format corresponds is determined by defining the table for associating the data format with data class in advance. The table structure is shown in FIG. 7. In FIG. 7, a data format-type correspondence table 71 includes data formats 72 and data classes 73. In the data classes 73, "a", "b", "c" correspond to the first, second and third classes described above respectively.

According to this embodiment, the browsing data are created from the bit-map data displayed on the display. Therefore, it is possible to create the browsing data corresponding to the application program-specific data without ever changing the application program. As a result, the data created by the application program that has been developed totally independent of the browsing program can be browsed even when the data format thereof is unknown.

Also, in the case where the format of the application-specific data can be interpreted by the browsing program, the browsing data is automatically created. The data of which the format can be interpreted can be browsed without registration by the user. Further, in the case where a scaled-down image can be created rapidly from the application-specific data, the browsing data is not required to be held in the disk and therefore the disk consumption is reduced.

In addition, since the scale-down algorithm is determined according to the class of the bit-map data at the time of registration of the browsing data, the display quality (visibility) of the scale-down bit-map data is improved.

When a browsing data is created, the particular data is temporarily displayed on the display. Therefore, the user can study whether the particular data should be registered or the registration range should be reset. More specifically, in the case where the scale-down ratio is so high that the contents cannot be identified, the registration range can be reduced to reduce the scale-down ratio in trials and errors.

According to this embodiment, although the maximum magnitude of the scale-down bit-map data is fixed to 415 in FIG. 4, the magnitude of the bit-map data can be made variable by fixing the maximum value of the scale-down ratio. In this case, extreme scale-down is avoided and therefore although the range that can be referenced is limited, the contents can be identified more easily. Also, the proper maximum value of scale-down ratio varies with the class of the bit-map data (whether a natural image, a line drawing or a text). A scale-down algorithm is thus set corresponding to the data class at 320 in FIG. 3, while at the same time setting the maximum value of scale-down ratio corresponding to the data class. In this case, the maximum value of scale-down ratio is held as an item of 14 in FIG. 1.

Apart from the browsing data derived from the scaled-down bit-map data according to this embodiment, the whole or part of the bit-map data before scale-down may be used with equal effect. Also, the vector data or font data obtained by recognizing the bit-map data can be employed as the browsing data.

Figure 8A:
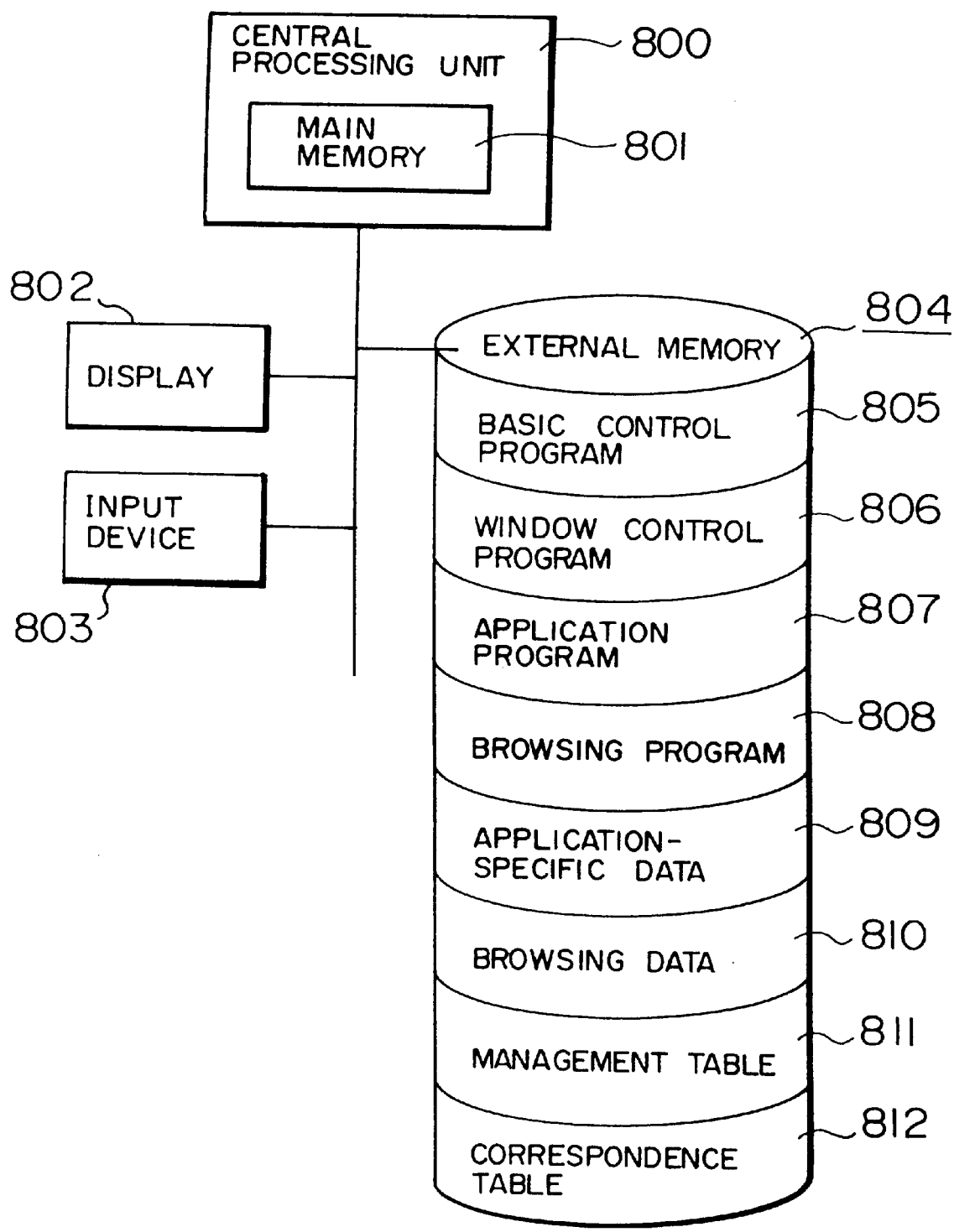

FIGS. 8A and 8B show a hardware configuration and a software configuration respectively of a modification of the embodiment of FIG. 1. In this modification, a central processing unit 800 having a main memory 801 is connected with a display unit 802 such as a bit-map display, an input unit such as a mouse or a keyboard and an external memory 804. The external memory 804 has stored therein a basic control program 805, a window control program 806, an application program 807, a browsing program 808, data application-specific 809, browsing data 810, a management table 811 and a correspondence table 812.

These programs and data stored in the external memory 804 are appropriately read into the main memory and executed by the central processing unit 800.

Although a software configuration is shown in FIG. 8B, the processing at the browsing data display 8081 corresponds to the flow shown in FIG. 5, and that at the browsing data generator/register 8082 to the flow shown in FIG. 3.

Now, another embodiment of the invention will be explained with reference to the drawings.

In the embodiment shown in FIGS. 1 to 8 to attain correspondence between the data name of the application-specific data and the browsing data, the user inputs the data name of the application-specific data at step 312 at the time of registering the browsing data. According to the embodiment under consideration, however, a method of attaining correspondence without this user operation will be described.

The browsing program 3 according to this embodiment, in addition to the functions described in the foregoing embodiment, is assumed to have the function of invoking the application program associated with an application-specific data when it is designated together with such operations as display, editing or printing. This function is realized by the use of the conventional method as disclosed in "Nikkei Bytes, May 1990 pp. 279–283".

Figure 9:
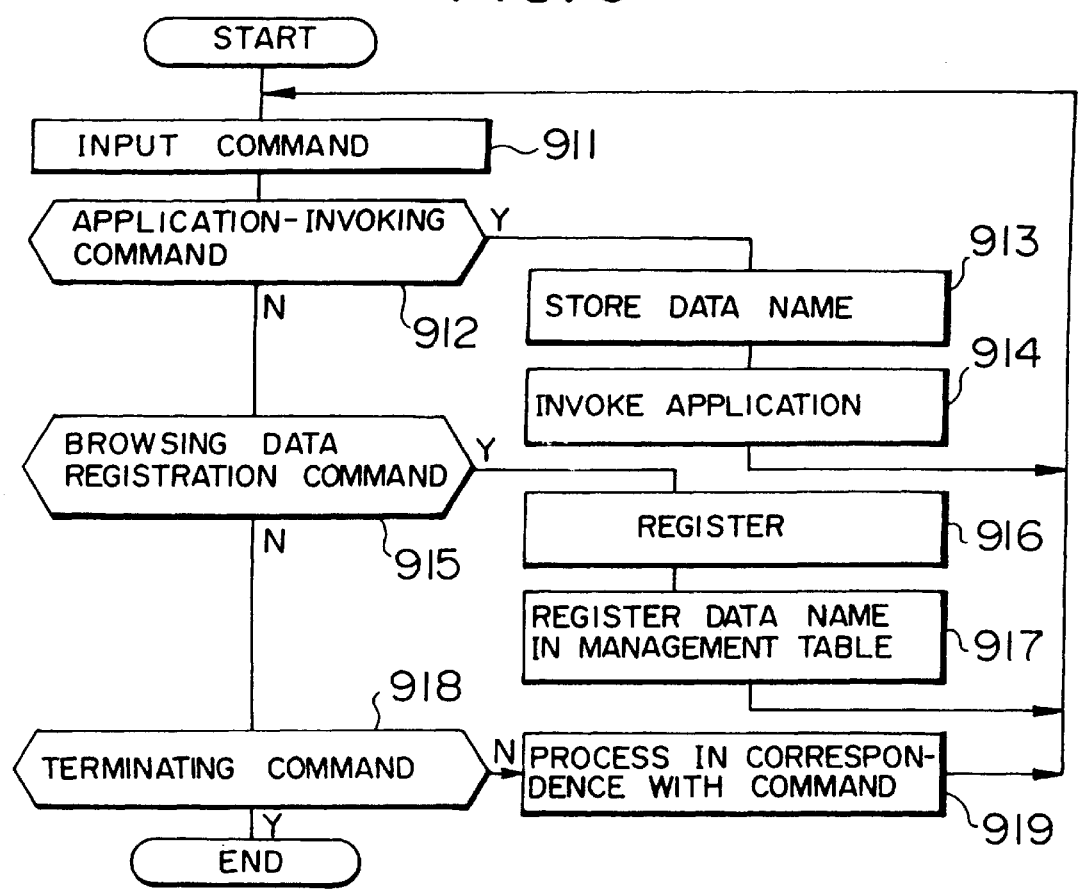
FIG. 9 is a flowchart showing the order of browsing processes.

The procedure for this browsing program will be explained with reference to FIG. 9. First, a command is input (step 911). In the case where this command is for invoking an application program (step 912), the data name of the application-specific data is stored (step 913), a corresponding application program is invoked (step 914), and the process returns to step 911. If the browsing data registration command is involved (step 915), on the other hand, the browsing data is registered (step 916), the data name stored at step 913 and the browsing data generated are registered in the management table (step 917), and the process returns to step 911. For other than the termination command (step 918), the processing to meet the command is performed (step 918), while in the case of the termination command (step 918), the process is terminated. The registration process at step 916 is the same as that of steps 320 to 329 in FIG. 3.

According to this embodiment, the user is not required to input the data name of the application-specific data.

Figure 10:
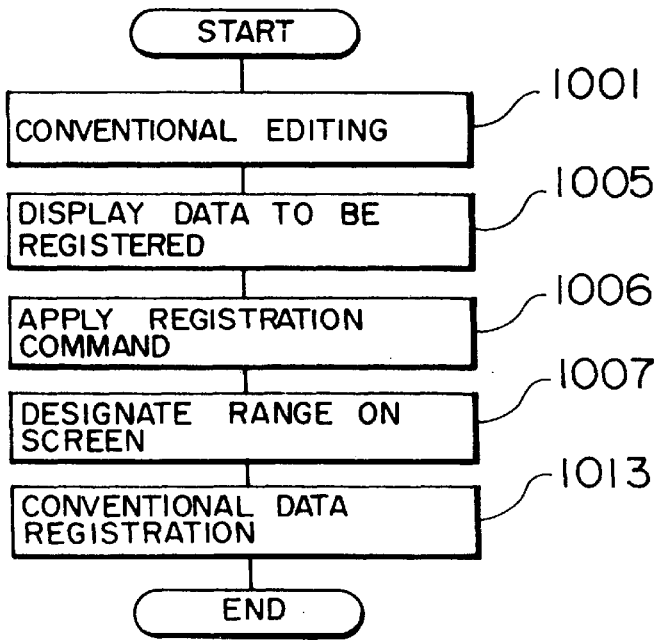
FIG. 10 is a flowchart showing the order of user operations.

Further, the user operations of steps 302 to 304, 306, and 308 to 311 in FIG. 3 are eliminated. Steps 302, 304, 306 and 311 are eliminated by fixing to one of the scaled-down bit-map data to be registered. The need of steps 308, 309 and 310, on the other hand, is eliminated by cancelling the confirmation by the user of the scaled-down bit-map data. Also, step 303 is not required if automatic decision is made by the bit-map data that has retrieved the type of the bit-map data. The relevant user operation procedure is shown in FIG. 10. The user first performs the conventional editing operation (step 1001), displays the desired data on the display (step 1005), inputs a registration command (step 1006), designates the range on the screen (step 1007), and registers the conventional data (step 1013), thereby terminating the process.

Now, explanation will be made about the method of automatic decision on the type of the bit-map data. The bit-map data is assumed to be expressed as a bit string of data corresponding to each pixel of the screen, and the bit-map data is assumed to be of four types classified according to "a black-and-white image or a color image" and "a natural image like a landscape photo or a line drawing like a spreadsheet".

Whether a black-and-white image or a color image involved can be decided according to whether the bit-map data is configured only of a bit string representing white or black. Also, whether a natural image or a line drawing is involved can be decided according to whether a predetermined number of rectangles of a predetermined size having the same internal bit strings exist over the entire range of the data.

According to this embodiment, even when one screen is configured of a plurality of windows, the bit-map data of the windows can be scaled down by an appropriate scale-down algorithm and then synthesized into a single scaled-down bit-map data. It is thus possible to maintain the visibility of the scaled-down bit-map data.

The embodiments shown in FIGS. 1 to 9, in which the bit-map data are retrieved through a window system, may alternatively use a printer driver in place of the window system. In the embodiment that follows, explanation will be made about a method of generating browsing data using the printer driver.

Figure 11:
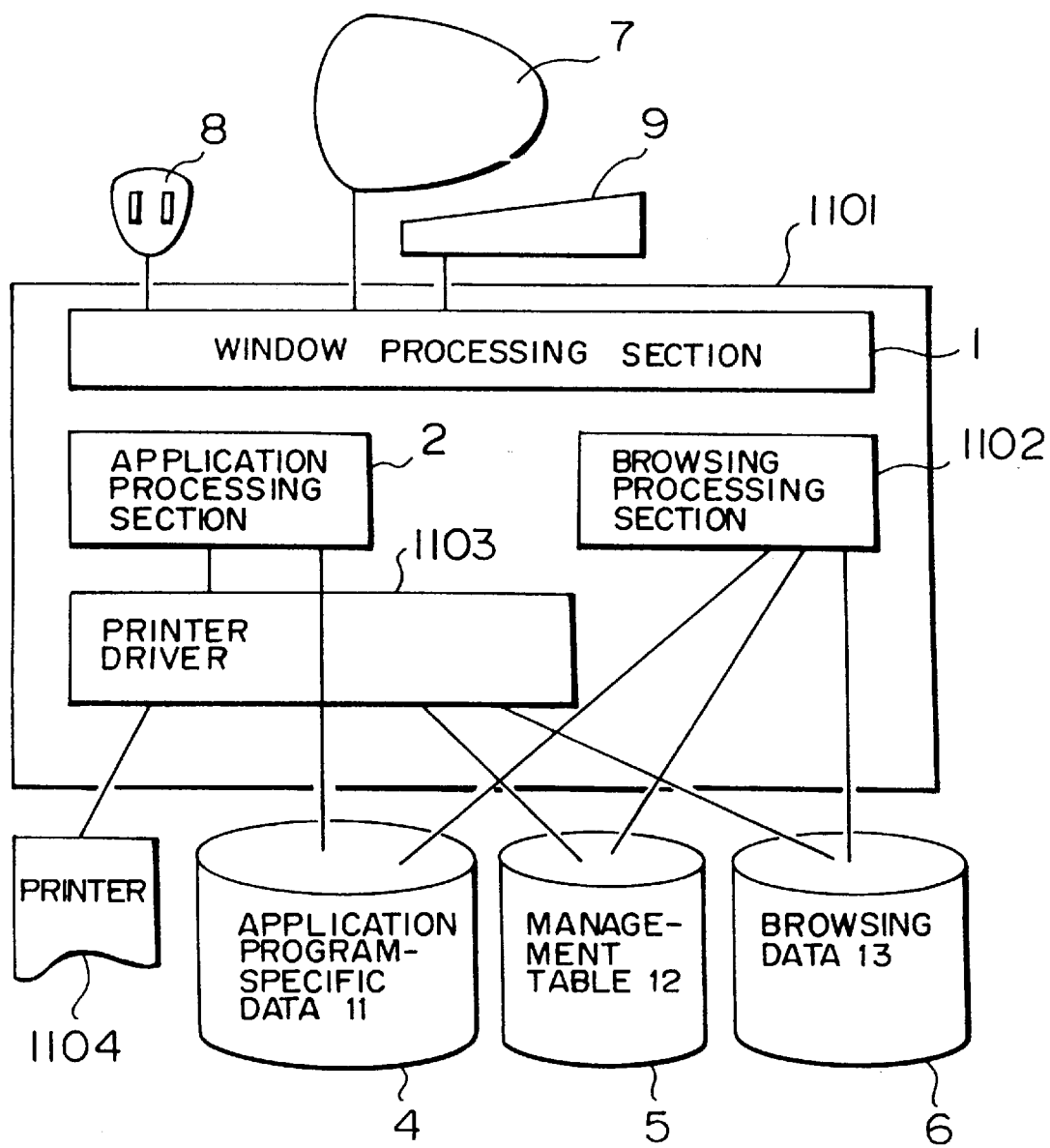
FIG. 11 is a block diagram showing the configuration of another embodiment.
Figure 12:
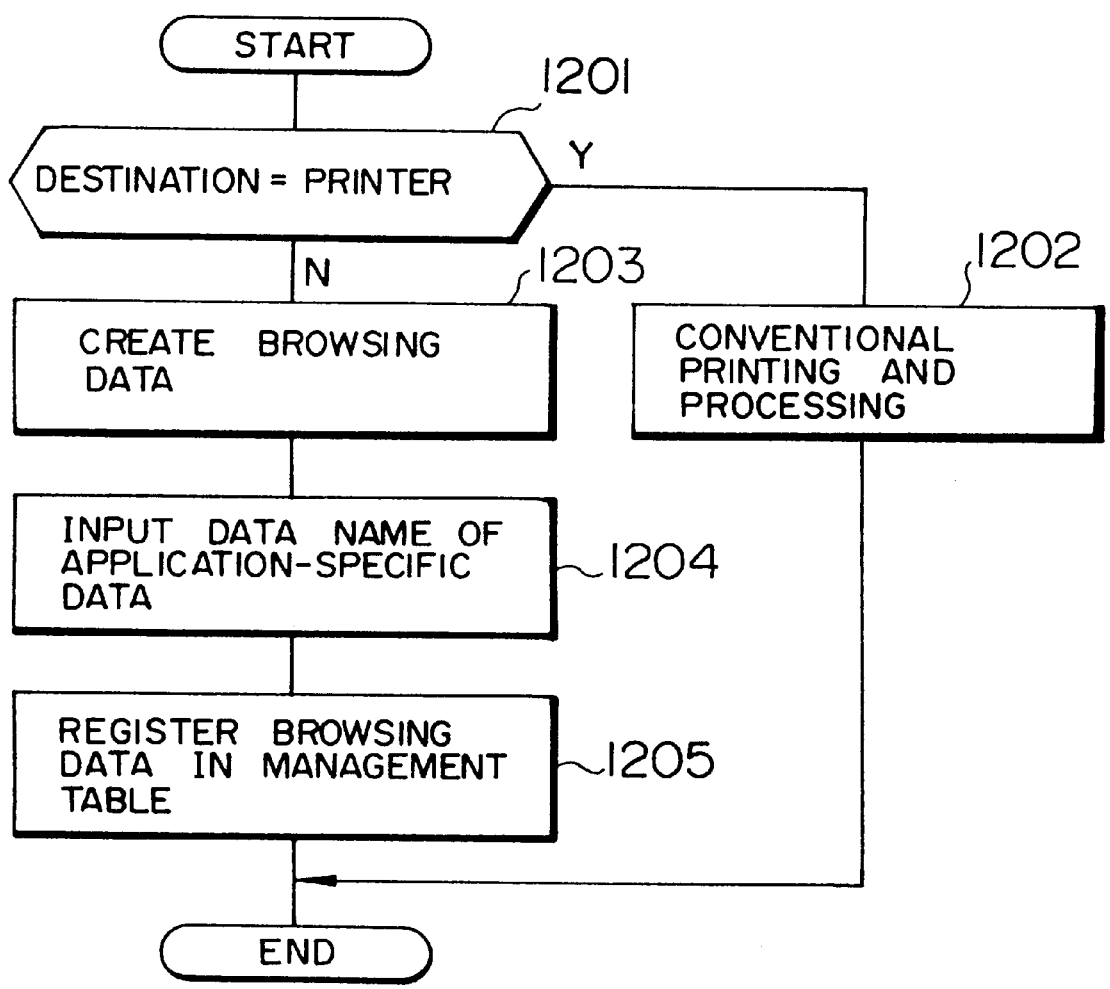
FIG. 12 is a flowchart showing the order of printer driver operation according to the embodiment shown in FIG. 11.

FIG. 11 is a block diagram showing an information processing system according to this embodiment, and FIG. 12 a flowchart showing-the operating procedure of the printer driver.

The information processing system according to this embodiment, as shown in FIG. 11, comprises a mouse 8 and a keyboard 9 for receiving an input from the user, a display 7, a system device 1101 for performing various processing operations, disks 4, 5, 6 for storing data, and a printer 1104 for outputting information on the paper. The system device 1101 includes an application processing section 2 for editing/displaying the media data such as texts, graphics, images and video, a browsing processing section 1102 for performing management of the relations between the application-specific data and the browsing data, scaled-down display of the browsing data, list display and registration of the browsing data, a window system for receiving the input from the mouse 8 and the keyboard 9 and sending them to the processing section 2 or 3 and displaying the output from the section 2 or 3 on the display 7, and a printer driver 1103 for outputting information to the printer in accordance with the instruction from the application, generating the browsing data and relating the browsing data to the application-specific data. The contents of the disks 4, 5, 6 are identical to those shown in the embodiments of FIGS. 1 to 9.

Next, the operating procedure of the printer driver 1103 will be explained with reference to FIG. 12. The printer driver, in addition to the conventional function of receiving the output information from the application program and applying it to the printer, has the function of generating the browsing data. First, a destination is decided (step 1202), and if the destination is the printer, the conventional output process is performed (step 1202).

In the case where the user designates the output for generating the browsing data, on the other hand, the browsing data is generated from the output information (step 1203), the data name of the application-specific data is input (step 1204), and the identifier of the browsing data and the data name of the application-specific data are registered in the management table (step 1205). The above-mentioned destination is set by way of the mouse or keyboard by the user in advance.

In the embodiments shown in FIGS. 1 to 10, the bit-map displayed on the screen is retrieved and used as browsing data, and therefore only those displayed on the screen can be used as the browsing data. According to the present embodiment, by contrast, the data to be applied to the printer are used, so that all the data can be used for browsing. It is thus possible to generate browsing data of a size that otherwise could not be contained in the screen.

Figure 13A:
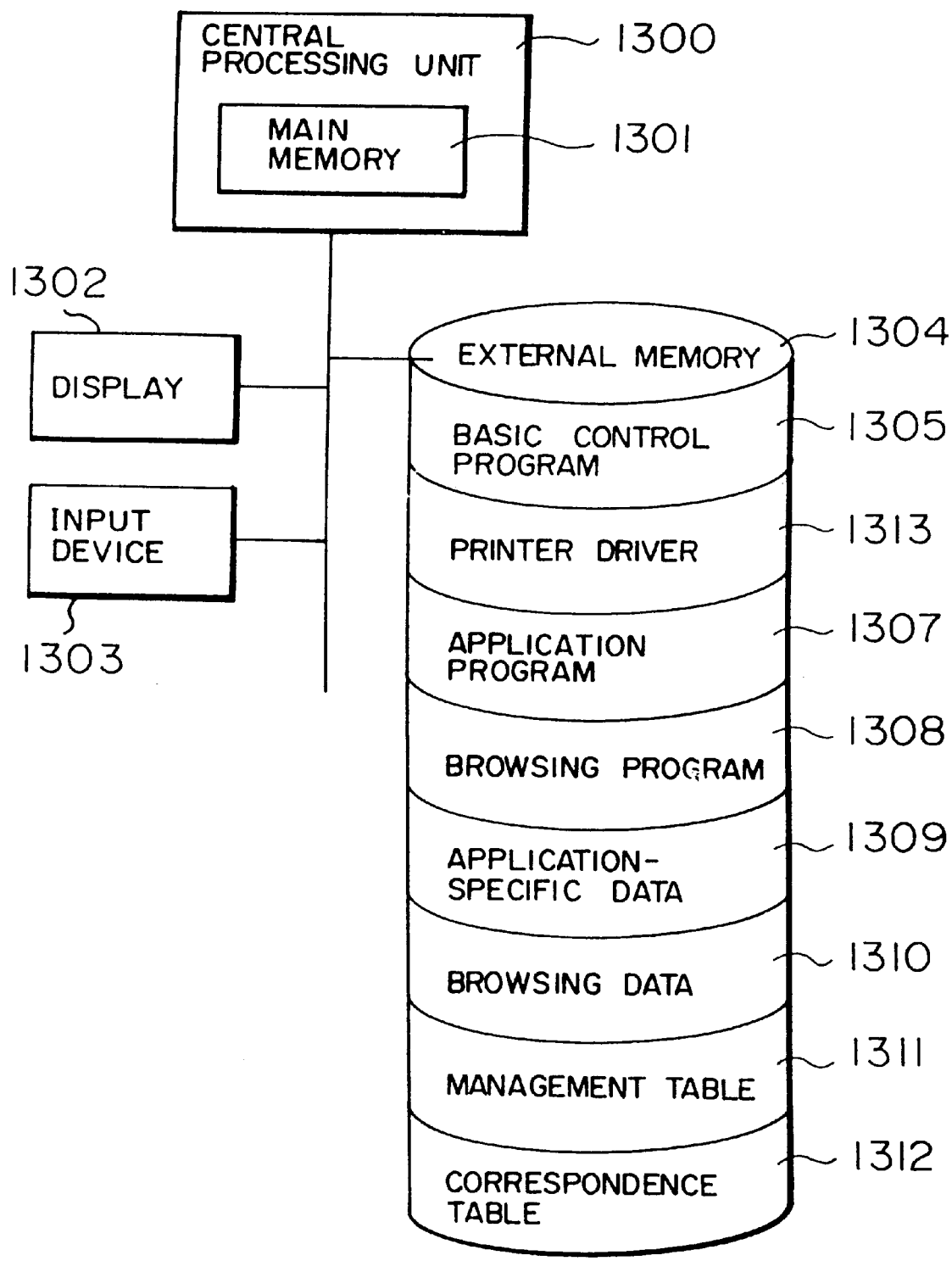

FIGS. 13A and 13B show the hardware and software configurations of a modification of the embodiment of FIG. 11. In this modification, a central processing unit 1300 having a main memory 1301 is connected with a display 1302 such as a bit-map display, an input unit 1303 such as a mouse or a keyboard, and an external memory 1304. This external memory 1304 has stored therein a basic control program 1305, a printer driver 1313, an application program 1307, a browsing program 1308, an application-specific data 1309, a browsing data 1310, a management table 1311 and a correspondence table 1312.

The programs and data stored in the external memory 1304, like those in the embodiment shown in FIGS. 8A, 8B, are appropriately read into the main memory and executed by the central processing unit 1300.

Although the software configuration is shown in FIG. 13B, the processing in the browsing data display 1381 is represented by the flow shown in FIG. 5, and the processing in the browsing data generator/register 1331 by the flow shown in FIG. 3.

Figure 14:
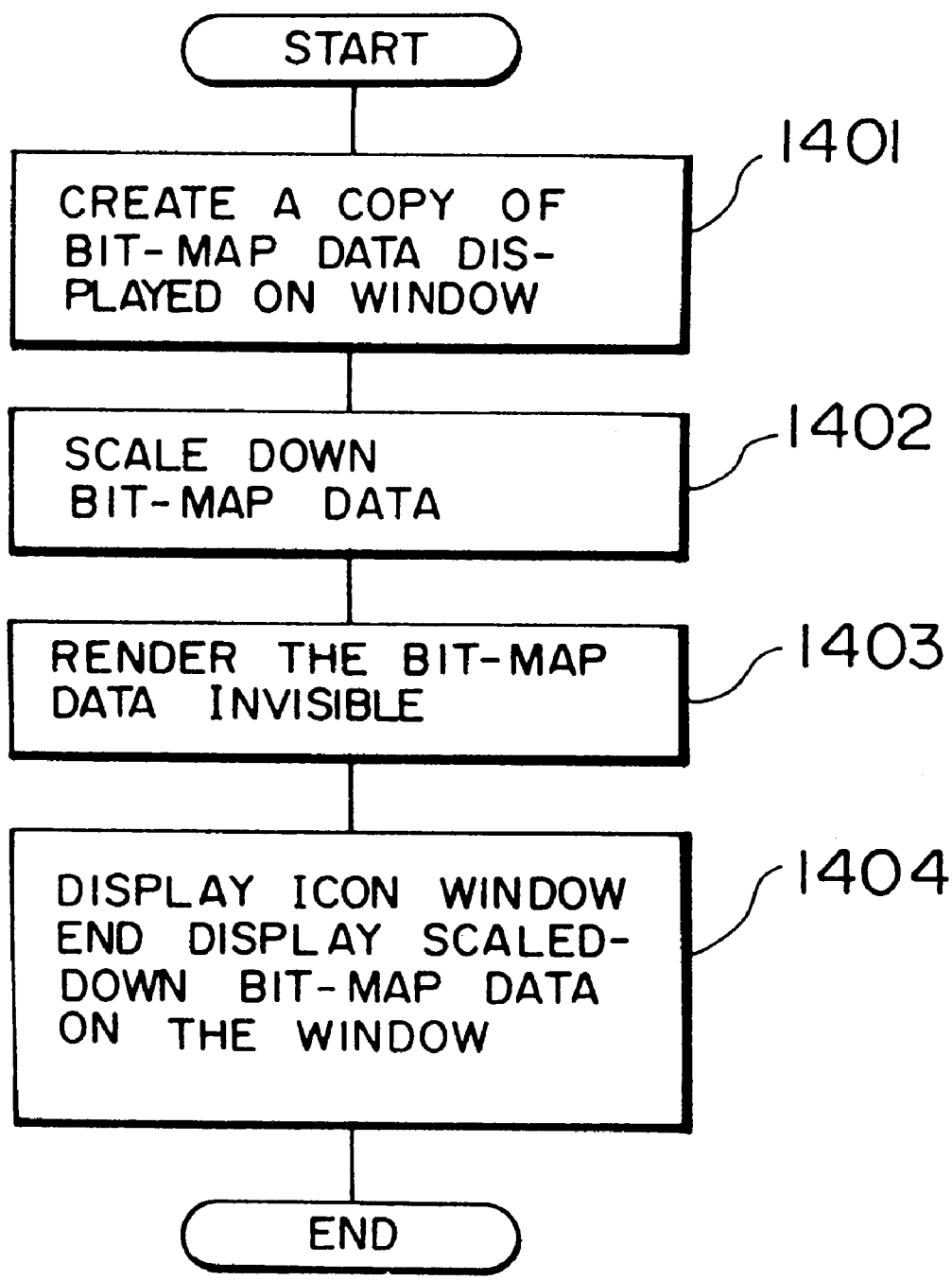
FIG. 14 is a flowchart showing the procedure for the scaled-down image display in a window.

Now, explanation will be made with reference to FIG. 14 about a method of displaying a scaled-down image of the original window in an icon window of a window system having the function of converting the window displayed on the screen into an icon window (iconifying) as described in "Introduction to X-Window OSF/Motif Window Manager" by Ryoichi Kinoshita.

The window system, upon receipt of a request for scaling down a window, generates a copy of the bit-map displayed on the particular window (step 1401), scales down the copy to the size of an icon (step 1402), sets the designated window in non-display state (step 1403), generates an icon window, and displays a scaled-down bit-map data on the icon window (step 1404).

When an icon is scaled down, as described with reference to the embodiments of FIGS. 1 to 9, the type of bit-map data may be automatically decided to use a scale-down algorithm suited to the particular type. Also, a maximum value of the scale-down ratio can be set to display only a portion of the scaled-down bit-map data in such a manner as not to scale down to more than that value.

Figure 15:
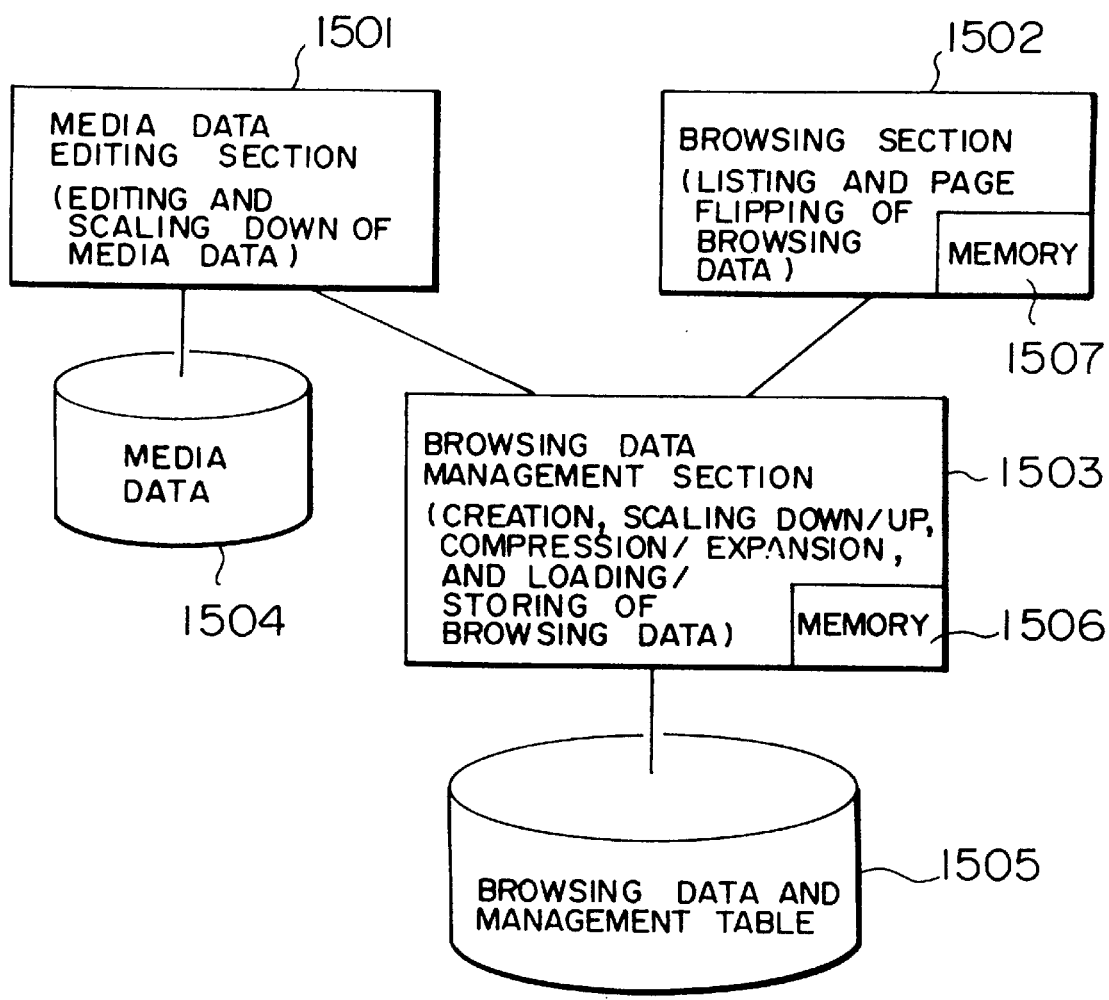
FIG. 15 is a flowchart showing still another embodiment.

FIG. 15 is a block diagram showing an information processing system according to another embodiment of the invention. In FIG. 15, numeral 1501 designates a media data editor for inputting/editing the media data such as texts, graphics, images and video, numeral 1502 a browsing section for displaying a list or flipping the pages of the browsing data, and numeral 1503 a browsing data management section for generating and managing the browsing data. Numeral 1504 designates a disk for storing the data file 25 input/edited at the media data editor 1501, and numeral 1505 a disk for storing the browsing data 22 and the management data 21. The media data editor 1501 not only inputs/edits but also scales down the media data. The browsing data management section 1503 scales down/up, compresses/expands the browsing data and them in a disc. The browsing data management section 1503 includes a work memory 1506.

Figure 16:
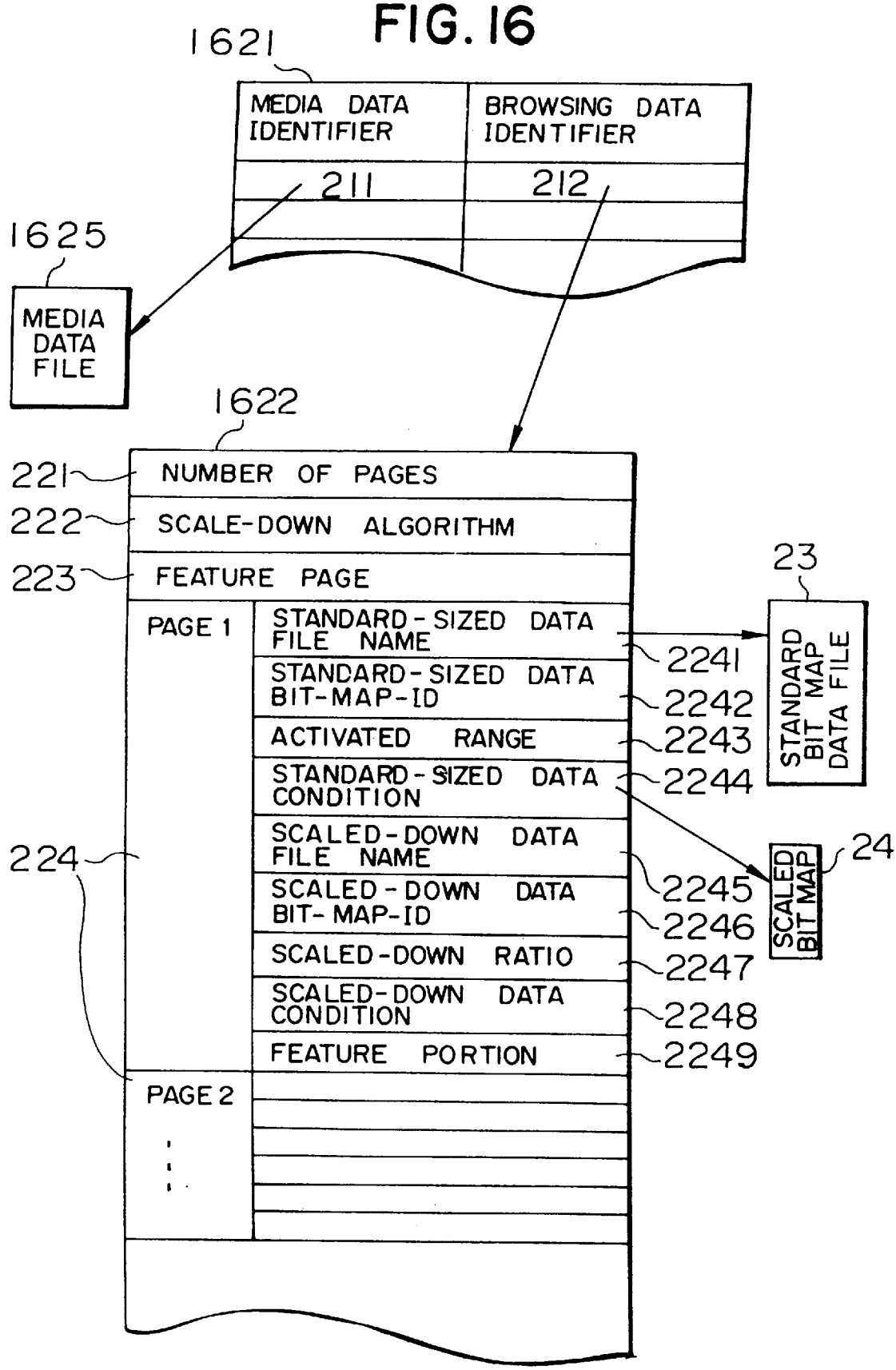
FIG. 16 is a diagram showing a configuration example of the data management table according to the embodiment of FIG. 15.

FIG. 16 shows the structure of the browsing data and the management table 1505 in FIG. 15. In FIG. 16, numeral 1621 designates a browsing data management table, and numeral 1622 browsing data. The browsing data management table 1621 is a list of two-item records including an identifier 211 for the media data and an identifier 212 for the browsing data 1622. The browsing data 1622 includes a list of a page number 221, a scale-down algorithm 222, a feature page 223 and page information 224. The page information 224 includes an identifier 2241 for the standard-sized bit-map file 23, a pointer 2242 (hereinafter referred to as a bit-map-id) to a region of the memory 1506 into which the file in the browsing data management section 1503 is read, a numerical value 2243 indicating the range (digit, line, width, height) read into the memory, a state graph 2244 indicating whether the bit-map data is read into the memory, an identifier 2245 of the file 24 for storing the scaled-down bit-map file 24, a bit-map-id 2246 for the scaled-down bit-map data, a state flag 2248 for the scaled-down bit-map data, and a numerical value 2249 (number of places, number of lines, width and height from origin) representing the page features.

In the description that follows, when the bit-map data is loaded in a memory in the browsing data management section 1503, the particular bit-map data is said to be active, and otherwise to be inactive.

Figure 23:
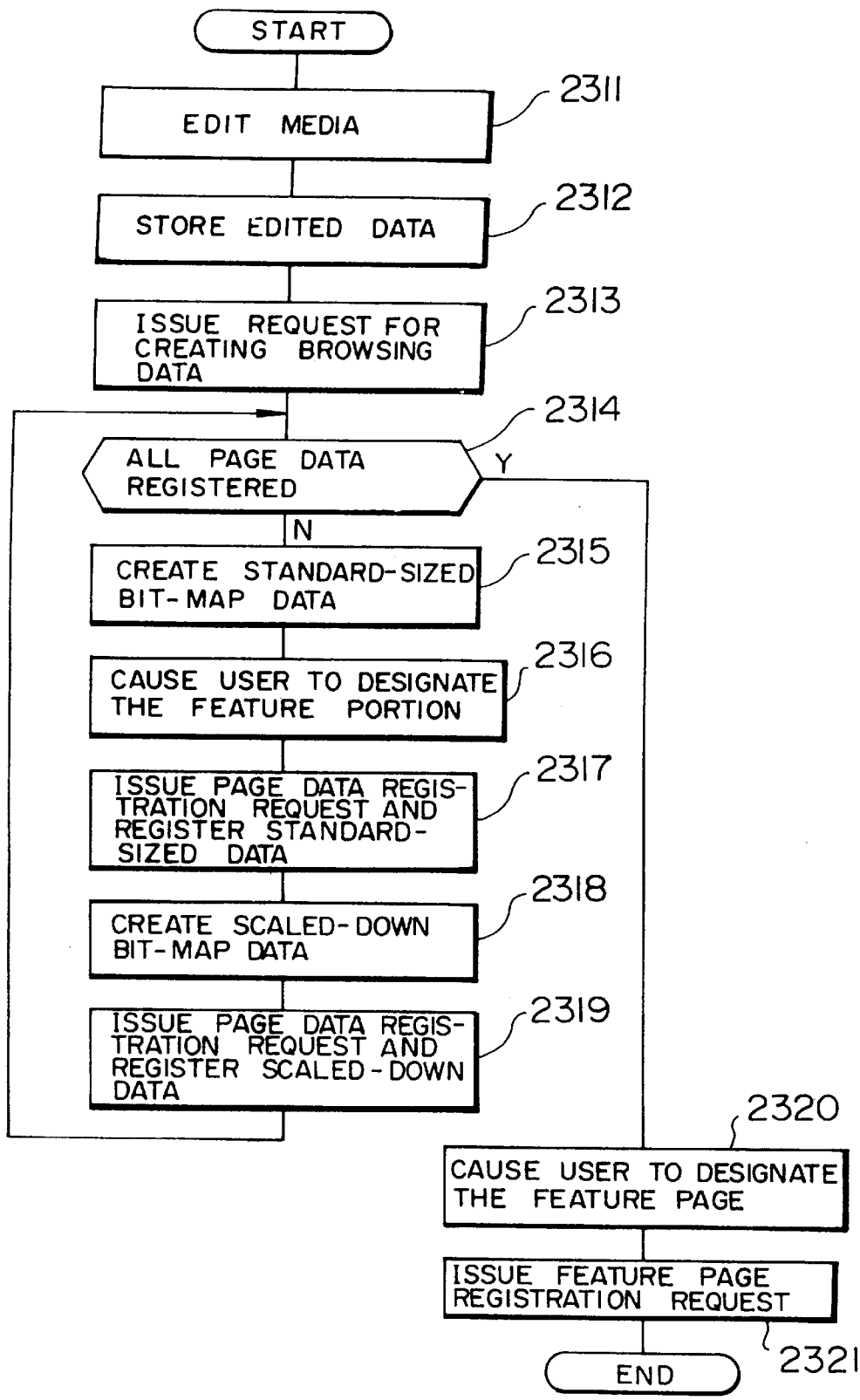
FIG. 23 is a flowchart showing the process at the media editing section.

FIGS. 17 to 21 show an example of the operation flow of the browsing data management section shown in FIG. 15, and FIG. 23 an example of the operation flow of the media data editor.

The browsing data management section 1503 receives a request from the media editor 1501 and the browsing section 1502 and performs the operation meeting the request. The request is in the number of 12 as shown in FIG. 22, each having a specific parameter and a return value. In FIG. 22, the media data identifier included in the item of parameter is for designating the media data 1504 in FIG. 15 and is, for example, the file name of the media data file 25.

These requests are applied from the media editor or the browsing section to the browsing data management section using the request transmission function or the remote procedure call function like Super ASCII V .3#10 133–140.

Figure 17:
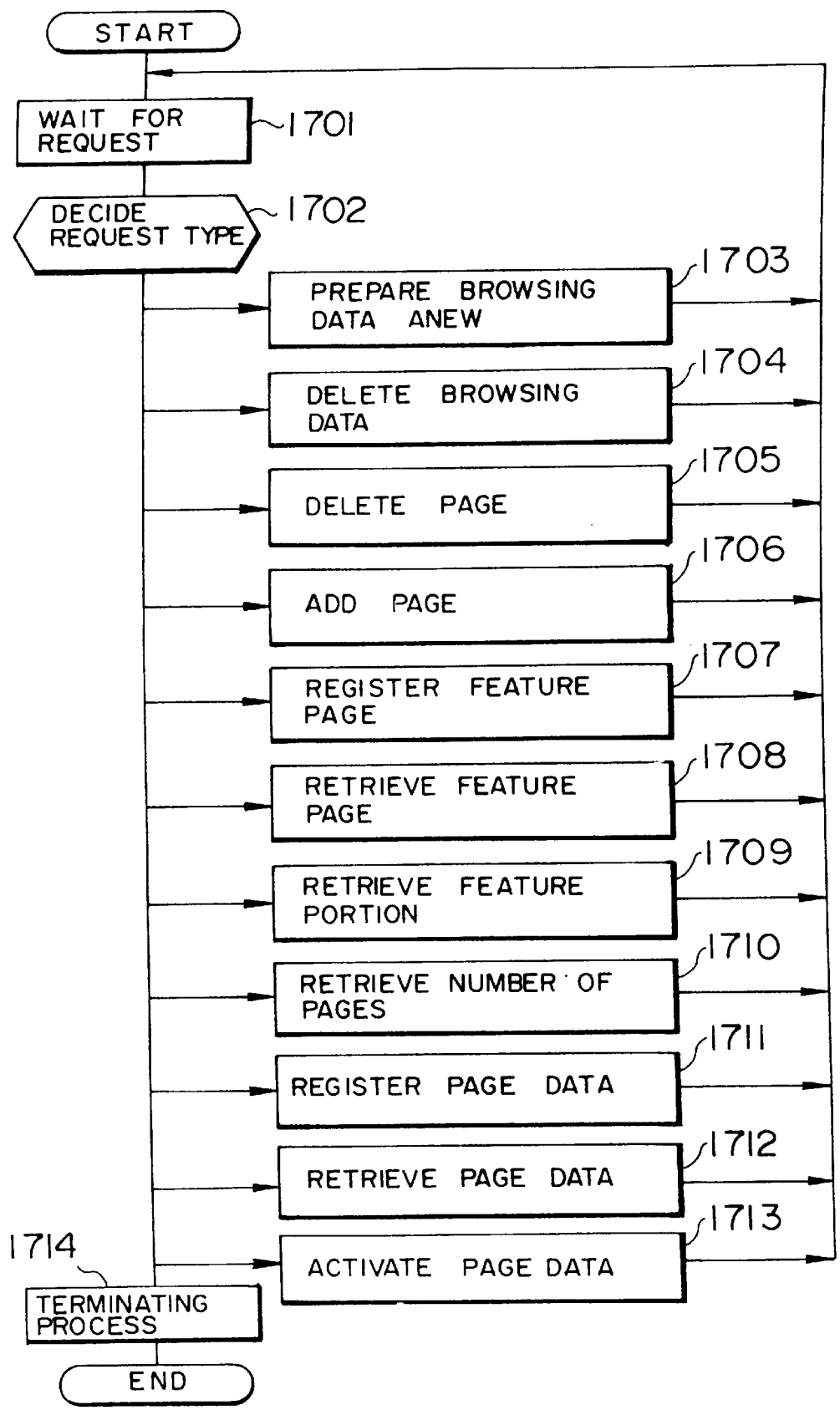
FIG. 17 is a flowchart showing the processes at the browsing data management section.

Next, the operation flow of the browsing data management section 1503 will be explained in detail with reference to FIGS. 17 to 21. FIG. 17 shows the general flow of operation. FIGS. 18, 19, 20, 21 show the process for newly generating the browsing data, registering page data, retrieving the page data and activating the page data respectively.

The browsing data 1503 first waits for a request from the media editor 1501 and the browsing section 1502 (step 1701), and decides on the type of the request when the request arrives. In the case where the request is for generating the browsing data, the process is performed for generating the browsing data anew (step 1703). In the case where the request is for deleting the browsing data, on the other hand, the browsing data management table 1621 is searched for a browsing data corresponding to the media data of the parameter, which is deleted simultaneously with the record in the management table (step 1704). Steps 1705 and 1713 that follow, to search for the browsing data, as in step 1702, use the browsing data management table 1621 and the identifier for the media data designated by the parameter. In the case where the request is for page deletion, the data of the page designated by the browsing data parameter is deleted thereby to reduce the number of pages by one (step 1705).

When the request is for page addition, on the other hand, the page data 224 is generated and by it to the end of the page data list, the number of pages is increased by one (step 1706). In the case where the request is for registration of a feature page, the page designated by a parameter is registered in the item 223 of the feature page of the browsing data (step 1707). In the case where the request is for retrieval of the feature page, the page in the feature page item 223 of the browsing page data 1622 is returned (step 1708). If the request is for retrieving the number of pages, the number in the page-number item 221 of the browsing data 1622 is returned (step 1709). When the request is for retrieving the feature section, the numeral in the item 22 of the page feature section designated by the browsing data 1622 is returned (step 1710). In the case where the request is for registration of page data, the page data is registered (step 1711), while if the request is for retrieving the page data, the page data is retrieved (step 1712). If the request is for activating the page data, the page data is activated (step 1713). If the request is for termination, the terminating process is performed. In other words, the browsing data management table 1621 and the browsing data 1622 are stored in the disks (step 1714) thereby to terminate the process.

Figure 18:
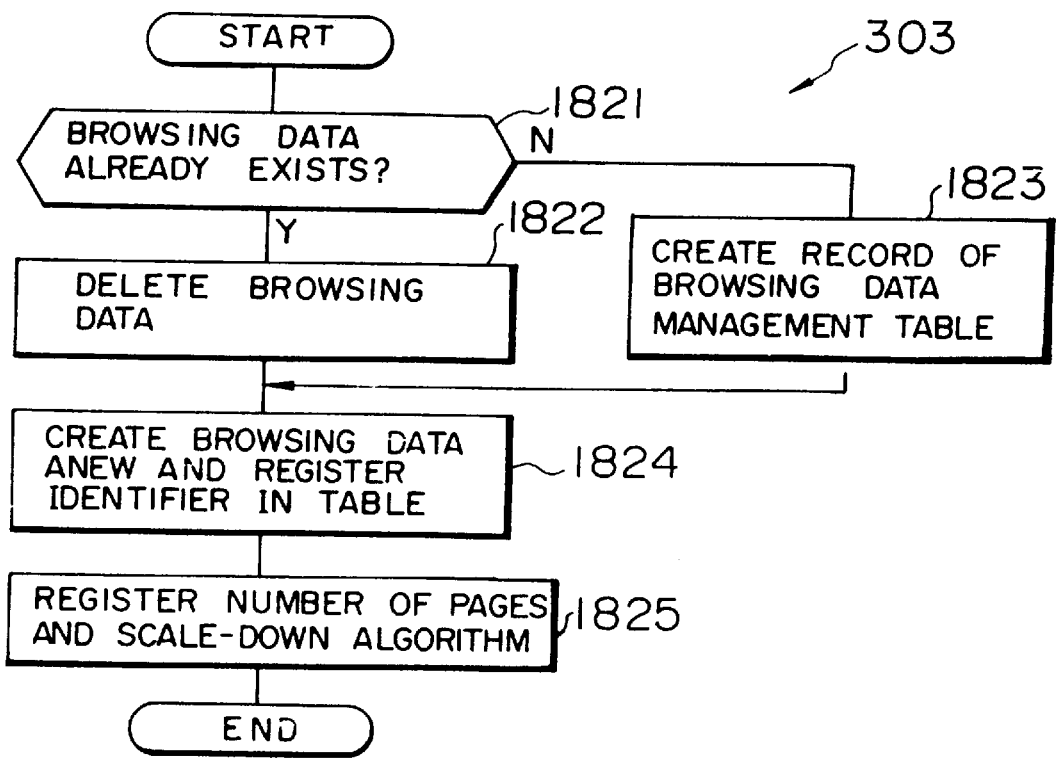
FIG. 18 is a flowchart for explaining the process for newly preparing the browsing data.

In the process for preparing the browsing data anew, as shown in FIG. 18, first, the browsing data management table is searched and decision is made as to whether there exists any browsing data corresponding to the media data of the parameter (step 1821). If there is any such data, the existing browsing data is deleted (step 1822); otherwise, the record of the browsing data management data 1621 is added by one and the media data identifier 211 is registered (step 1823). Next, the browsing data 1622 is generated, and the identifier 212 thereof is registered against the media data identifier 211 (step 1824). The number of pages and the scale-down algorithm designated by a parameter are registered in the page number item 221 of the browsing data 1622 (1825), thereby terminating the process.

Figure 19:
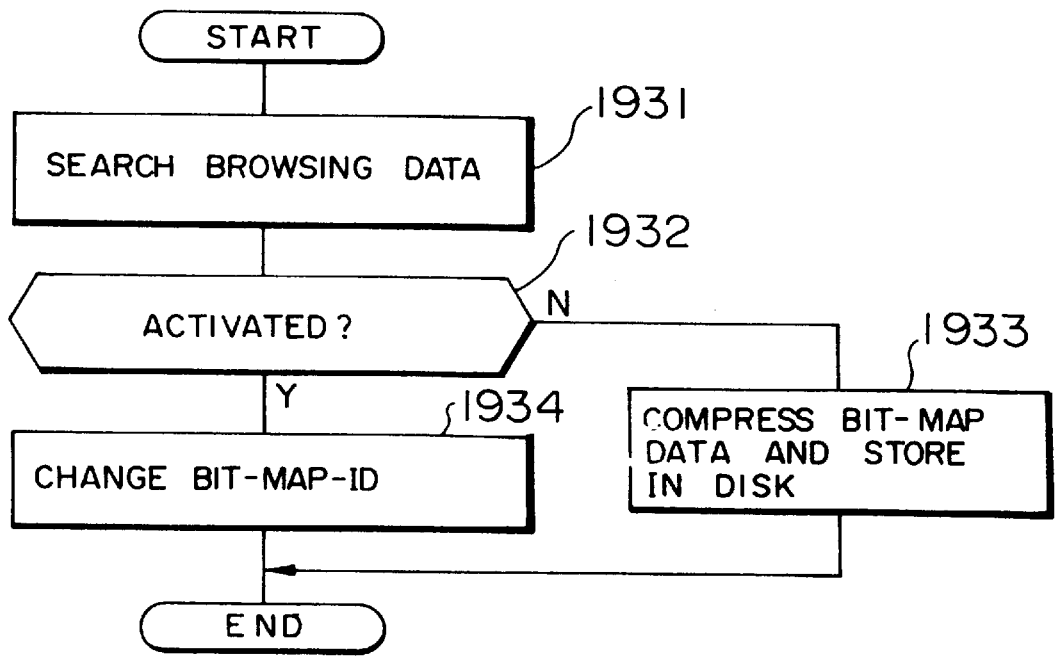
FIG. 19 is a flowchart showing the page data registration process.

In the page data registration, as shown in FIG. 19, the browsing-data is searched from the media data identifier designated by the parameter (step 1931), and decision is made as to whether the bit-map data corresponding to the scale-down ratio and the page designated of the browsing data is active or not (step 1932). If it is not active, the bit-map data is compressed and stored in the disk (step 1933). If the data is active, on the other hand, the bit-map-id 2242 or 2246 in the browsing data 1622 is changed as designated by the parameter.

Figure 20:
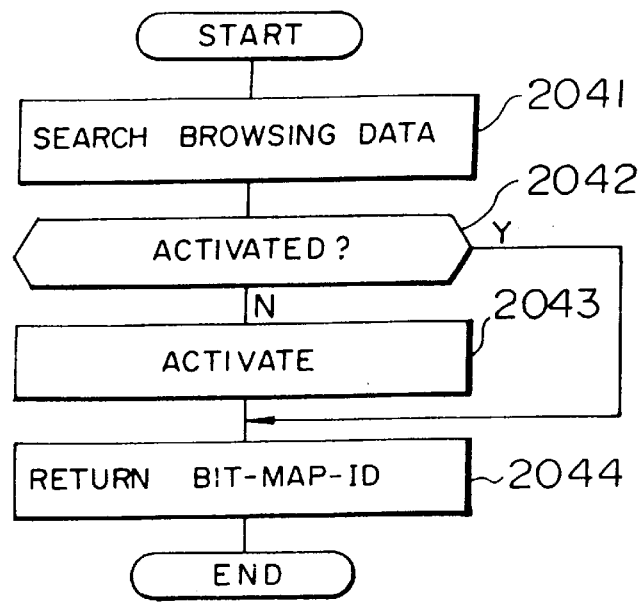
FIG. 20 is a flowchart showing the process of page data retrieval.

In the page data processing section, as shown in FIG. 20, the browsing data is searched for from the media data identifier designated by the parameter (step 2041), and decision is made as to whether the bit-map data corresponding to the scaling ratio and the page designated by the parameter are active or not (step 2042). If the page and the bit-map data are not active, the activation process is performed (step 2043). Next, the bit-map-id 2242 or 2246 is returned (step 1934) thereby to terminate the process.

Accordingly, a request is sent from browsing section 1502 to browsing data management section 1503, and bit map id obtained as a result of processing in browsing data management section 1503 is sent back to browsing section 1502. While, a standard size id (2242) is selected in the event scaling ratio is 1.0, a compressed data bit-map-id (2246) is selected is the event the scaling ratio is other than 1.0, and returned to browsing section 1502.

Figure 21:
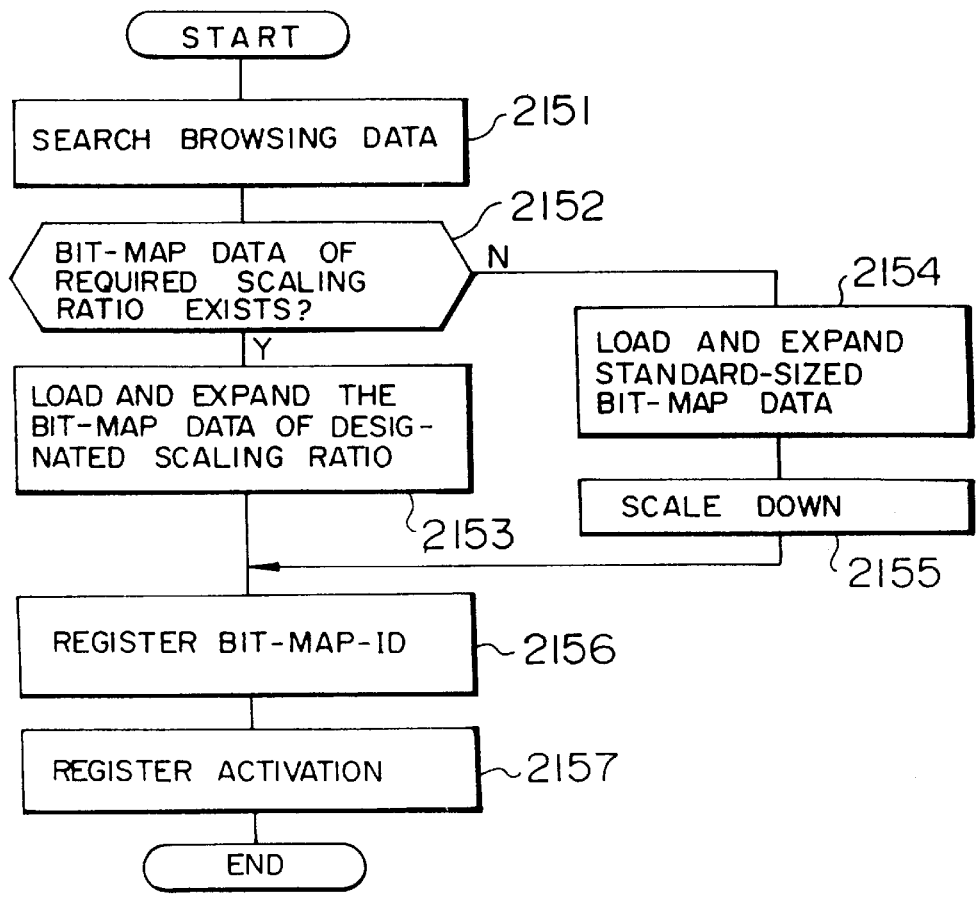
FIG. 21 is a flowchart showing the process of page data activation.

In the page data activation process, as shown in FIG. 21, the browsing data is searched from the media data identifier designated by the parameter (step 2151), and decision is made as to whether the bit-map data of a scaling ratio requested is available or not (step 2152). If there is available such data, the bit-map data in the designated range is read from the bit-map file of the particular scaling ratio for expansion thereby to register the range in 2243 (step 2153). Otherwise, the bit-map file of a range designated with a scaling ratio smaller than designated for expansion and the range is registered in 2243 (step 2154). The algorithm thus registered is scaled down (step 2155). Next, the bit-map-id thus read is registered in the browsing data (step 2156), and that the fact that the particular bit-map data is active is registered (step 2157) thereby to terminate the process.

Next, the processing operation at the media editor 1501 will be explained in detail with reference to FIG. 23.

The media editor first edits the media (step 2311) and stores the edited media data in the disk (step 2312). In the next step, the request for preparing the browsing data is sent to the browsing data management section (step 2313) and the process representing less than the number of pages required for browsing is repeated (step 2314). More specifically, a bit-map data of standard size is created (step 2315), the user is caused to designate the feature portion (step 2316), a page data registration request is issued (step 2317), a scaled-down bit-map data is created (step 2318), and a page data registration request for registration of the particular data is issued (step 2319). Next, the user is caused to input the feature page (step 2320), and a request for feature page registration is issued (step 2321) thereby to terminate the process.

Figure 24:
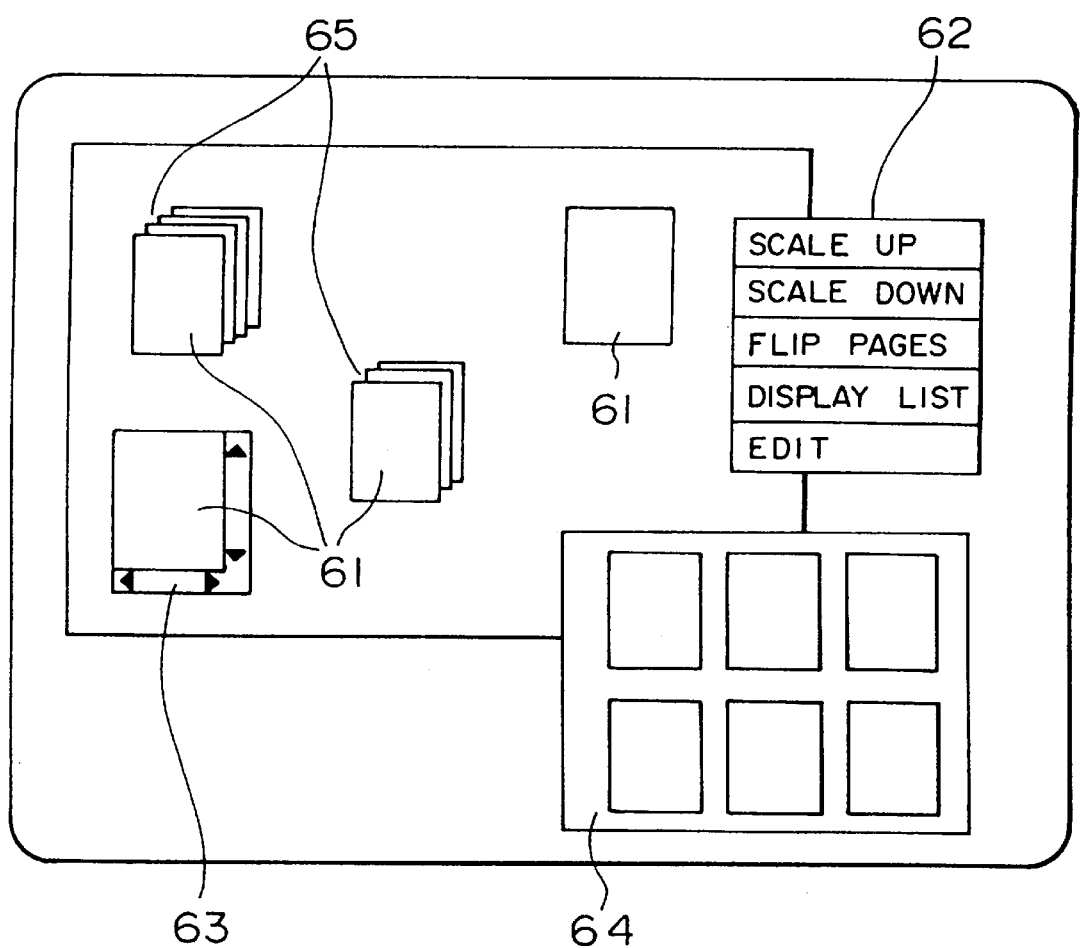
FIG. 24 shows an example desk-top display corresponding to the browsing section.

Now, explanation will be made about the case in which the browsing data is utilized on the desk-top screen of the workstation or the personal computer. In the case under consideration, the desk-top processing corresponds to the browsing section 1502 in FIG. 15. FIG. 24 shows an example of desk-top screen. In FIG. 24, numeral 61 designates a scaled-down bit-map data displayed as an icon, numeral 62 a manipulation menu, numeral 63 a scroll bar attached to the icon 61, numeral 64 a window for scaled-down list display of the page data, and numeral 65 a page number display for indicating the number of pages of the browsing data by thickness. Icon-manipulating commands are assumed to exist as shown by the menu 62. They include a scale-up command for displaying a scaled-up browsing data, a scale-down command for displaying a scaled-down browsing data, a page-flipping command for displaying the contents of all pages in succession at the same position automatically, a list display command for creating a new window 64 and displaying the contents of all the pages on the window 64, and an edit command for editing the corresponding media data. Each icon is associated with a corresponding media data.

To display the browsing data by icons on the screen, the media data identifier, the page, the scaling ratio and the range of retrieval are designated, and a page data retrieval request is issued to the browsing data management section 1503 thereby to acquire the bit-map data. This bit-map data is displayed on the screen, a page number retrieval request is issued to acquire the page number, and the page number is displayed in association with the particular number. This process is repeated the number of times equal to the number of media data to be displayed.

To scale up or scale down the bit-map data displayed in an icon, a media data identifier corresponding to the icon 61 is obtained, a scaling ratio suitable for scaling up or scaling down the identifier is set as a parameter, a page data retrieval request is issued, and the bit-map data thus obtained is displayed in place of the bit-map data that has thus far been displayed. At the time of scale-up, the user is caused to designate a position in an icon and the bit-map data is displayed around the particular position.

The processes described below are repeated by the number of pages for performing the page flipping. Specifically, the media data on display and the bit-map data for the scaling ratio are obtained by issuing a page data retrieval request. This data is displayed, and after waiting a predetermined length of time, a similar processing is performed for the next page. In the process, the bit-map data is displayed at the same position on the screen for all the pages.

To display a list of all the page contents, a window 64 is created, a page data retrieval request equivalent to the number of pages is issued, a scaled-down bit-map data for all the pages is obtained, and they are displayed on the window 64 thus created.

The icon 61 has the function of changing the size and scrolling like the prior art window such as the workstation. More specifically, the icon and the bit-map data are compared in size, and in the case where the bit-map data is larger than the icon, a scroll bar 63 is automatically attached to the icon and manipulated to make the reference range changeable. Also, the size change renders the size of reference range changeable.

Further, the bit-map data of the page corresponding to a designated position is displayed by designating the page number display by mouse or the like.

According to this embodiment, the browsing data management section is kept in active state and separated from the other sections all the time. As a consequence, in the case where the browsing data is required by the browsing section, the contents can be accessed without invoking the program for media data editing or the display program. Also, at least the contents can be displayed without the media-editing program if the browsing data is available.

Assume that a buffer (or memories 1506, 1507) accessible at high speed is built in the browsing data management section 1503 and the browsing section 1502. The page data can be displayed immediately without disk access by issuing an advance request for activation to the page data having a high likelihood of display by the browsing section.

Although the bit-map data is used as browsing data according to this embodiment, the invention is not limited to it, but a string of printer control commands or vector data may alternatively be used with equal effect. Also, the browsing data is not necessarily of one type but a plurality of types.

Further, apart from the desk-top application of the browsing section explained above, the browsing section can be used as a media data search section of a tool for creating a new text or presentation title by combining various media such as the authoring tool or desk-top publishing tool. Also, a single browsing data can be used based on a plurality of tools (browsing sections) such as desk-top, authoring tool and desk-top publishing tool.

FIG. 25 shows an example of hardware configuration of the media editor 1501, the browsing section 1502 and the browsing data management section 1503 in a distributed environment.

In FIG. 25, the LAN is connected with central processing units 100a, b, c having a main memory built therein. These central processing units 100a, b, c include a display unit 102 and an input unit 103. Also, the central processing units 100a, b, c are connected with external memories 104a, b, c respectively.

The external memory 104a has stored therein a basic control program 105, a window control program 106, a browsing program 108, a browsing data 110, a management table 111 and a correspondence table 112.

Also, the external memory 104b has stored therein a basic control program 105, a window control program 106 and a browsing program 108.

Further, the external memory 104c includes a basic control program 105, a window control program 106, an application program 107 and an application-specific data 109 built therein.

In this configuration, each central processing units 100a, b, c is able to exchange data mutually through LAN, therefore even in the event central processing unit 100a is not operated application specific data can be obtained through central processing unit 100b by browsing data 110.

According to the above-mentioned embodiments, the texts, graphs, spreadsheets, animation or other data created by an arbitrary application program for making a display on the display or outputting to a printer, the image data input from the image scanner, the video data input from the camera, and also the composite data prepared by combining any of these data can be rapidly browsed without invoking such an application program anew. Also, the browsing data can be created without altering the application program.

Further, such data as texts, graphs, spreadsheets or animation created from an application program, the image data input from the image scanner, the video data input from the camera or the like, and also the composite data prepared or the like media data can be accessed readily and rapidly without invoking the application for the user to display the contents of the data. Further, the quality of the scaled-down image used for access can be improved.

What is claimed is:

1. A method for displaying an icon of media-data by using a processing unit, comprising the steps of:

a) selecting an editing method according to kind of said media-data;

b) generating image-data by operating on at least part of the contents of said media-data by using said selected editing method; and c) displaying an icon on the basis of said image-data.

2. A method for generating an icon of media-data by using a processing unit, comprising the steps of:

a) selecting a generating method of said icon according to a data format of said media-data;

b) generating image data by operating on at least part of the contents of said media-data, if said media-data has an image format;

c) generating image data by changing to an image format data from a data format for outputting onto an output device an execution result of an application program corresponding to said media-data, if said media-data has a different format from image format; and d) generating an icon on the basis of said image data generated in said step b) or c).

3. A method for displaying an icon of a window as an execution result of an application program by using a processing unit, comprising the steps of:

a) detecting a designation inputted from an input device for changing said window displayed at execution of said application program to an icon;

b) generating an icon by scaling down at least one of part of bit-map data corresponding to contents displayed on said window; and c) displaying said icon.

* * * * *